United States Patent
Wilhelmsson et al.

(10) Patent No.: US 10,419,093 B2
(45) Date of Patent: Sep. 17, 2019

(54) ENABLING CHANNEL STATE FEEDBACK FOR MULTI-USER TRANSMISSION IN A WIRELESS COMMUNICATION SYSTEM

(71) Applicant: Telefonaktiebolaget LM Ericsson (publ), Stockholm (SE)

(72) Inventors: Leif Wilhelmsson, Dalby (SE); Andreas Bergström, Vikingstad (SE); Yu Wang, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 502 days.

(21) Appl. No.: 14/912,788

(22) PCT Filed: Jan. 8, 2016

(86) PCT No.: PCT/SE2016/050006
§ 371 (c)(1),
(2) Date: Feb. 18, 2016

(87) PCT Pub. No.: WO2017/119829
PCT Pub. Date: Jul. 13, 2017

(65) Prior Publication Data
US 2018/0062723 A1 Mar. 1, 2018

(51) Int. Cl.
*H04B 7/06* (2006.01)
*H04L 1/00* (2006.01)
(Continued)

(52) U.S. Cl.
CPC ......... *H04B 7/0626* (2013.01); *H04B 7/0452* (2013.01); *H04L 1/0015* (2013.01);
(Continued)

(58) Field of Classification Search
CPC ... H04B 7/0626; H04B 7/0452; H04L 1/0026; H04L 5/0057
See application file for complete search history.

(56) References Cited

U.S. PATENT DOCUMENTS

2007/0230373 A1* 10/2007 Li .................... H04B 7/0447
370/267
2011/0009139 A1 1/2011 Nagata et al.
(Continued)

FOREIGN PATENT DOCUMENTS

| EP | 2690903 A1 | 1/2014 |
| WO | 2008018761 A2 | 2/2008 |
| WO | 2011035204 A2 | 3/2011 |

OTHER PUBLICATIONS

Khadka, Ashim et al., "Cooperative Transmission Strategy for Downlink Distributed Antenna Systems Over Time-Varying Channel", 2015 IEEE Global Communications Conference, 2015, 1-6.
(Continued)

*Primary Examiner* — Jeffrey M Rutkowski
*Assistant Examiner* — Chae S Lee
(74) *Attorney, Agent, or Firm* — Sage Patent Group

(57) ABSTRACT

There is provided a method and corresponding device for enabling channel state feedback for multi-user transmission in a wireless communication system. The method comprises performing (S1), for each of a number of users, a classification of the user into one of at least two groups based on a measure of the speed of the temporal channel variation for the user. The method also comprises selecting (S2), for each of the users, a channel state feedback mechanism based on the classification.

28 Claims, 19 Drawing Sheets

(51) Int. Cl.
*H04L 5/00* (2006.01)
*H04B 7/0452* (2017.01)
*H04W 84/12* (2009.01)

(52) U.S. Cl.
CPC .......... *H04L 1/0026* (2013.01); *H04L 1/0027* (2013.01); *H04L 1/0031* (2013.01); *H04L 5/0057* (2013.01); *H04L 5/0091* (2013.01); *H04W 84/12* (2013.01)

(56) References Cited

U.S. PATENT DOCUMENTS

| 2011/0069629 | A1* | 3/2011 | Breit | H04B 7/0626 370/252 |
| 2012/0087265 | A1* | 4/2012 | Tamaki | H01Q 1/246 370/252 |
| 2014/0023005 | A1* | 1/2014 | Sundaresan | H04W 72/048 370/329 |
| 2014/0093005 | A1* | 4/2014 | Xia | H04B 7/0617 375/267 |
| 2015/0063128 | A1* | 3/2015 | Garikipati | H04B 7/0417 370/252 |
| 2015/0333812 | A1* | 11/2015 | Breit | H04B 7/0626 370/329 |
| 2016/0127019 | A1* | 5/2016 | Schelstraete | H04B 7/0626 370/252 |
| 2018/0302930 | A1* | 10/2018 | Wang | H04W 76/10 |

OTHER PUBLICATIONS

Bejarano, Oscar et al., "MUTE: Sounding Inhibition for MU-MIMO WLANs", 2014 Eleventh Annual IEEE International Conference on Sensing, Communication, and Networking (SECON) IEEE, 2014, 135-143.

Ding, LV et al., "On the Prediction of Time-varying Channels in MISO Beamforming Systems", IEEE, 2009, 1-5.

IEEE, "Part 11: Wireless LAN Medium Access Control (MAC) and Physical Layer (PHY) Specifications Amendment 4: Enhancements for Very High Throughput for Operation in Bands below 6 GHz", IEEE Std 802.11ac (Amendment to IEEE Std 802.11-2012, as amended by IEEE Std 802.11ae-2012, IEEE Std 802.11aa-2012, and IEEE Std 802.11ad-2012), 2013, 1-425.

Unknown, Author, "CQI Feedback Control and Content in E-UTRA", 3GPP TSG-RAN WG1 Meeting #49 R1-072077 Kobe, Japan, May 7-11, 2007, 1-5.

* cited by examiner

ENABLING CHANNEL STATE FEEDBACK FOR MULTI-USER TRANSMISSION IN A WIRELESS COMMUNICATION SYSTEM

TECHNICAL FIELD

The proposed technology generally relates to multi-user transmission in a wireless communication system, and methods for enabling channel state feedback for multi-user transmission as well as corresponding devices, network nodes, wireless communication devices, computer programs, computer-program products and apparatuses.

BACKGROUND

There is a general demand for improved performance in wireless communication systems, and especially in scenarios with many connected users where multi-user transmission modes may be useful. FIG. 1 is a schematic diagram illustrating a simplified example of a network node 10 communicating with multiple users 20.

By way of example, today many wireless standards uses Orthogonal Frequency Division Multiplexing (OFDM) mainly due to the fact that it allows for relatively low complex processing in case of high data rate and high bandwidth where the communication channel is frequency selective. OFDM also allows for a simple way to share the channel between different uses by simply allocating different sets of sub-carriers to different users, known as Orthogonal Frequency-Division Multiple Access (OFDMA).

Another multi-user transmission scheme is based on Multi-User Multiple Input Multiple Output (MU-MIMO).

It is desirable that the allocation of sub-carriers is based on detailed knowledge of the channel conditions for the different users. This kind of allocation of sub-carriers is commonly known as Frequency Selective Scheduling (FSS).

With reference to a particular and non-limiting example of a Wireless Local Area Network (WLAN) system, the network node may be referred to as an Access Point (AP) and the user equipment may be referred to as Station (STA). Naturally, FSS is applicable also to other standards and communication systems.

Although FSS potentially gives a performance gain, it requires that the AP has knowledge of the channels to the different STAs. Such knowledge is typically obtained through channel sounding, i.e., the channels between the AP and the different STAs are measured and based on the obtained measurements, the AP can decide how to allocate sub-carriers to different users. The measured channel knowledge, the Channel State Information (CSI), is then fed back from the STAs to the AP as Channel State Information Feedback (CSI FB).

When trying to optimize the gain that can be obtained by FSS, it is essential to keep the overhead related to obtaining the channel knowledge at the AP at a minimum. Furthermore, there is always latency between the time the channel is measured in the STAs and the time the reported CSI measurement is used in the AP for DL transmissions. During this time, the channel may have changed which means the reported CSI measurement may be obsolete. It's also essential to keep the latency in a range so that the channel does not change significantly during this period.

There are several existing feedback mechanisms that are applicable to system based on Carrier Sensing Multiple Access (CSMA), such as e.g. WLAN. These mechanisms may be applied to obtain CSI for OFDMA transmissions or beamforming.

POLL Feedback

In the IEEE 802.11ac standard, as an example, a feedback mechanism commonly referred to as POLL Feedback has been specified for beamforming. As illustrated in FIG. 2, an AP sends a Null Data Packet Announcement (NDP-A) to initiate feedback by informing the STAs to be ready to measure the channel. The following NDP transmission invokes the CSI from the first STA, i.e. STA1. In the STA the CSI is estimated from the HT-LTF in the preamble portion of the sounding packet, e.g. NDP. The CSI is normally included in a management frame called Action-FB and sent from the STA to the AR Then the AP sends out a Poll packet to obtain CSI from other STAs sequentially. Eventually a multi-user transmission in the downlink is sent from the AP to the STAs based on the CSI received from the STAs.

The overhead of this mechanism includes the transmission of NDP-A, NDP, Poll and Action-FB frames. The latency is relatively short since the transmission is right after the sounding.

There are variations of the Poll feedback mechanism, e.g. the CSI from multiple STAs may be transmitted in one UL-OFDMA frame instead of in the sequential manner.

Reference [1] discloses a method for adapting the CSI feedback rate in multi-user communication systems based on e.g. IEEE 802.11ac. If the feedback rate is too slow, this leads to an inaccurate beamforming, while an excessive feedback rate lead to unnecessary overhead. Therefore, polling messages to STAs with slowly evolving channels may be less frequent, compared to polling messages transmitted to a STA with a faster evolving channel.

Reference [2] relates to a method for collecting CSI, using a downlink Multi-User Multiple Input Multiple Output (MU-MIMO) sounding protocol. There is a large sounding overhead in the 802.11ac protocol, which grows with the number of users in the system. Therefore, the AP determines whether a user is currently being affected by a highly dynamic channel. If the channel is considered stable, no channel sounding is performed before the MU-MIMO transmission.

PIGGYBACK Feedback

With so-called PIGGYBACK feedback, the CSI is sent together with an ACK or Block ACK (BA) frame as shown in FIG. 3. Compared to POLL feedback, the overhead may be less since no NDP-A, NDP and Poll frames are exchanged. To estimate the CSI, the STAs usually measure the High Throughput-Long Training Field (HT-LTF) in the preamble portion of the previous data transmission from the AP. It implies longer latency between the time when the channel is measured and the time when the CSI is actually used. The latency includes the duration of one DL transmission and the channel contention time for the AP to obtain the channel access for the next DL transmission.

In general, FSS requires channel knowledge from STAs that costs transmission overhead. Moreover, the feedback may be obsolete if the latency is too long relative to the channel temporal variation. The existing CSI feedback mechanisms either have shorter latency with higher overhead or vice versa. To achieve FSS gain for DL-OFDMA transmission, CSI from multiple STAs is required which means both the overhead and latency may be higher comparing to a single user case. The same problem applies to beamforming where CSI is also required at the transmitter.

Reference [3] relates to channel prediction in time varying channels. In practical systems, the CSI obtained by feedback channels may be outdated, especially for high mobility users. One way to combat this is through channel prediction, where the CSI at the transmission instance is predicted using a Kalman-filter.

There is a general demand for improvements relating to channel state feedback for multi-user transmission in wireless communication systems.

SUMMARY

It is an object to provide a method for enabling channel state feedback for multi-user transmission in a wireless communication system.

Another object is to provide a method performed by a network node adapted for communication with a number of wireless communication devices in a wireless communication system.

It is also an object to provide a method, performed by a network node, for enabling channel state feedback in a wireless communication system.

Yet another object is to provide a method, performed by a wireless communication device, for enabling channel state feedback in a wireless communication system. Still another object is to provide a device configured to enable channel state feedback for multi-user transmission in a wireless communication system.

It is an object to provide a network device comprising such a device.

It is also an object to provide a network node adapted for communication with a number of wireless communication devices in a wireless communication system.

Another object is to provide a network node configured to enable channel state feedback in a wireless communication system.

Yet another object is to provide a wireless communication device configured to enable channel state feedback in a wireless communication system.

Still another object is to provide a computer program for enabling, when executed, channel state feedback for multi-user transmission in a wireless communication system.

It is also an object to provide another computer program.

Another object is to provide a corresponding a computer-program product.

Yet another object is to provide an apparatus for enabling channel state feedback for multi-user transmission in a wireless communication system.

Still another object is to provide apparatus for enabling channel state feedback from wireless communication devices in a wireless communication system.

These and other objects are met by embodiments of the proposed technology.

According to a first aspect, there is provided a method for enabling channel state feedback for multi-user transmission in a wireless communication system. The method comprises performing, for each of a number of users, a classification of the user into one of at least two groups based on a measure of the speed of the temporal channel variation for the user. The method also comprises selecting, for each of the users, a channel state feedback mechanism based on the classification.

According to a second aspect, there is provided a method performed by a network node adapted for communication with a number of wireless communication devices in a wireless communication system. The method comprises grouping the wireless communication devices into at least two groups according to a measure of the speed of the temporal channel variation of the wireless communication devices. The method also comprises selecting, for each group, a respective channel state feedback mechanism to acquire channel state information from the group of wireless communication devices.

According to a third aspect, there is provided a method, performed by a network node, for enabling channel state feedback in a wireless communication system. The method comprises sending, to a wireless communication device, i) a request message for requesting information representative of temporal channel variation from the wireless communication device and/or ii) a configuration message for configuring conditions for the wireless communication device to send the information representative of the temporal channel variation. The method also comprises receiving information representative of the temporal channel variation from the wireless communication device to enable classification of the wireless communication device into one of at least two groups based on a measure of the speed of the temporal channel variation for the wireless communication device and selection of a channel state feedback mechanism based on the classification.

According to a fourth aspect, there is provided a method, performed by a wireless communication device, for enabling channel state feedback in a wireless communication system. The method comprises estimating temporal channel variation for a channel between a network node and the wireless communication device. The method also comprises sending information representative of the temporal channel variation to the network node to enable classification of the wireless communication device into one of at least two groups based on a measure of the speed of the temporal channel variation for the wireless communication device and selection of a channel state feedback mechanism based on the classification.

According to a fifth aspect, there is provided a device configured to enable channel state feedback for multi-user transmission in a wireless communication system. The device is configured to perform, for each of a number of users, a classification of the user into one of at least two groups based on a measure of the speed of the temporal channel variation for the user. The device is also configured to select, for each of the users, a channel state feedback mechanism based on the classification.

According to a sixth aspect, there is provided a network device comprising a device according to the fifth aspect.

According to a seventh aspect, there is provided a network node adapted for communication with a number of wireless communication devices in a wireless communication system. The network node is configured to group the wireless communication devices into at least two groups according to a measure of the speed of the temporal channel variation of the wireless communication devices. The network node is configured to select, for each group, a respective channel state feedback mechanism to acquire channel state information from the group of wireless communication devices.

According to an eighth aspect, there is provided a network node configured to enable channel state feedback in a wireless communication system. The network node is configured to send, to a wireless communication device, i) a request message for requesting information representative of temporal channel variation from the wireless communication device and/or ii) a configuration message for configuring conditions for the wireless communication device to send the information representative of the temporal channel variation. The network node is also configured to receive information representative of the temporal channel variation from the wireless communication device to enable classification of the wireless communication device into one of at least two groups based on a measure of the speed of the temporal channel variation for the wireless communication device and selection of a channel state feedback mechanism based on the classification.

According to a ninth aspect, there is provided a wireless communication device configured to enable channel state feedback in a wireless communication system. The wireless communication device is configured to estimate temporal channel variation for a channel between a network node and the wireless communication device. The wireless communication device is also configured to send information representative of the temporal channel variation to the network node to enable classification of the wireless communication device into one of at least two groups based on a measure of the speed of the temporal channel variation for the wireless communication device and selection of a channel state feedback mechanism based on the classification.

According to a tenth aspect, there is provided a computer program for enabling, when executed, channel state feedback for multi-user transmission in a wireless communication system. The computer program comprising instructions, which when executed by at least one processor, cause the at least one processor to:
 performing, for each of a number of users, a classification of the user into one of at least two groups based on a measure of the speed of the temporal channel variation for the user; and
 selecting, for each of the users, a channel state feedback mechanism based on the classification.

According to an eleventh aspect, there is provided a computer program comprising instructions, which when executed by at least one processor, cause the at least one processor to:
 group wireless communication devices into at least two groups according to a measure of the speed of the temporal channel variation of the wireless communication devices; and
 select, for each group, a respective channel state feedback mechanism to acquire channel state information from the group of wireless communication devices.

According to a twelfth aspect, there is provided a computer-program product comprising a computer-readable medium having stored thereon a computer program according to the tenth or eleventh aspect.

According to a thirteenth aspect, there is provided an apparatus for enabling channel state feedback for multi-user transmission in a wireless communication system. The apparatus comprises a classification module for performing, for each of a number of users, a classification of the user into one of at least two groups based on a measure of the speed of the temporal channel variation for the user. The apparatus also comprises a selection module for selecting, for each of the users, a channel state feedback mechanism based on the classification.

According to a fourteenth aspect, there is provided an apparatus for enabling channel state feedback from wireless communication devices in a wireless communication system. The apparatus comprises a grouping module for grouping the wireless communication devices into at least two groups according to a measure of the speed of the temporal channel variation of the wireless communication devices. The apparatus also comprises a selection module for selecting, for each group, a respective channel state feedback mechanism to acquire channel state information from the group of wireless communication devices.

In this way, improved channel state feedback for multi-user transmission in a wireless communication system is enabled. By way of example, a channel state feedback mechanism can be selected that is optimized or at least well suited for a particular user or group of users, depending on a measure of the speed of the temporal channel variation. In particular, system efficiency can be improved by reducing the overhead related to channel state feedback, while ensuring the quality and/or reliability of the acquired channel state information.

Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

Throughout the drawings, the same reference designations are used for similar or corresponding elements.

For a better understanding of the proposed technology, it may be useful to begin with a brief system overview and/or analysis of the technical problem.

As used herein, the non-limiting terms "wireless communication device", "station", "User Equipment (UE)", and "terminal" may refer to a mobile phone, a cellular phone, a Personal Digital Assistant (PDA), equipped with radio communication capabilities, a smart phone, a laptop or Personal Computer (PC), equipped with an internal or external mobile broadband modem, a tablet with radio communication capabilities, a target device, a device to device UE, a machine type UE or UE capable of machine to machine communication, Customer Premises Equipment (CPE), Laptop Embedded Equipment (LEE), Laptop Mounted Equipment (LME), USB dangle, a portable electronic radio communication device, a sensor device equipped with radio communication capabilities or the like. In particular, the term "wireless communication device" should be interpreted as non-limiting terms comprising any type of wireless device communicating with a network node in a wireless communication system and/or possibly communicating directly with another wireless communication device. In other words, a wireless communication device may be any device equipped with circuitry for wireless communication according to any relevant standard for communication.

As used herein, the non-limiting term "network node" may refer to access points, base stations, network control nodes such as access controllers, network controllers, radio network controllers, base station controllers, and the like.

As used herein, the term "network device" may refer to any device located in connection with a communication network, including but not limited to devices in access networks and similar network structures. The term network device may also encompass cloud-based network devices.

Figure 1:
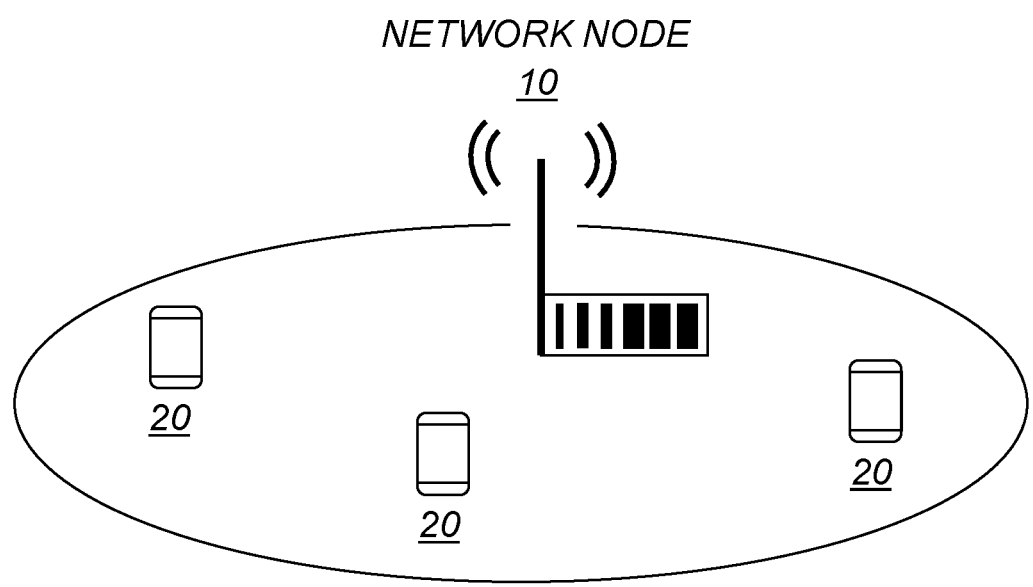
FIG. 1 is a schematic diagram illustrating a simplified example of a network node communicating with multiple users.
Figure 2:
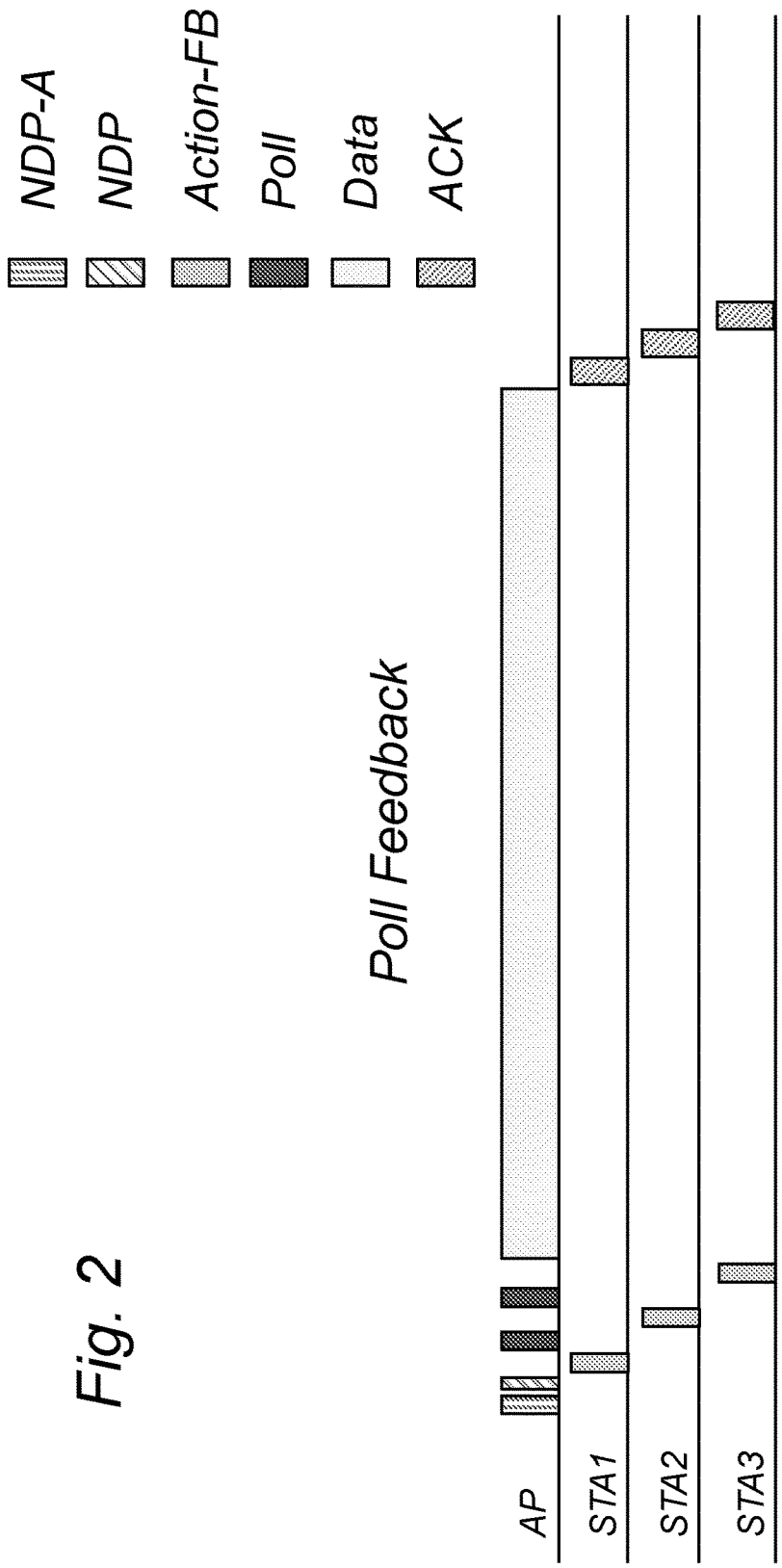
FIG. 2 is a schematic diagram illustrating an example of a POLL feedback mechanism for acquiring channel state feedback.
Figure 3:
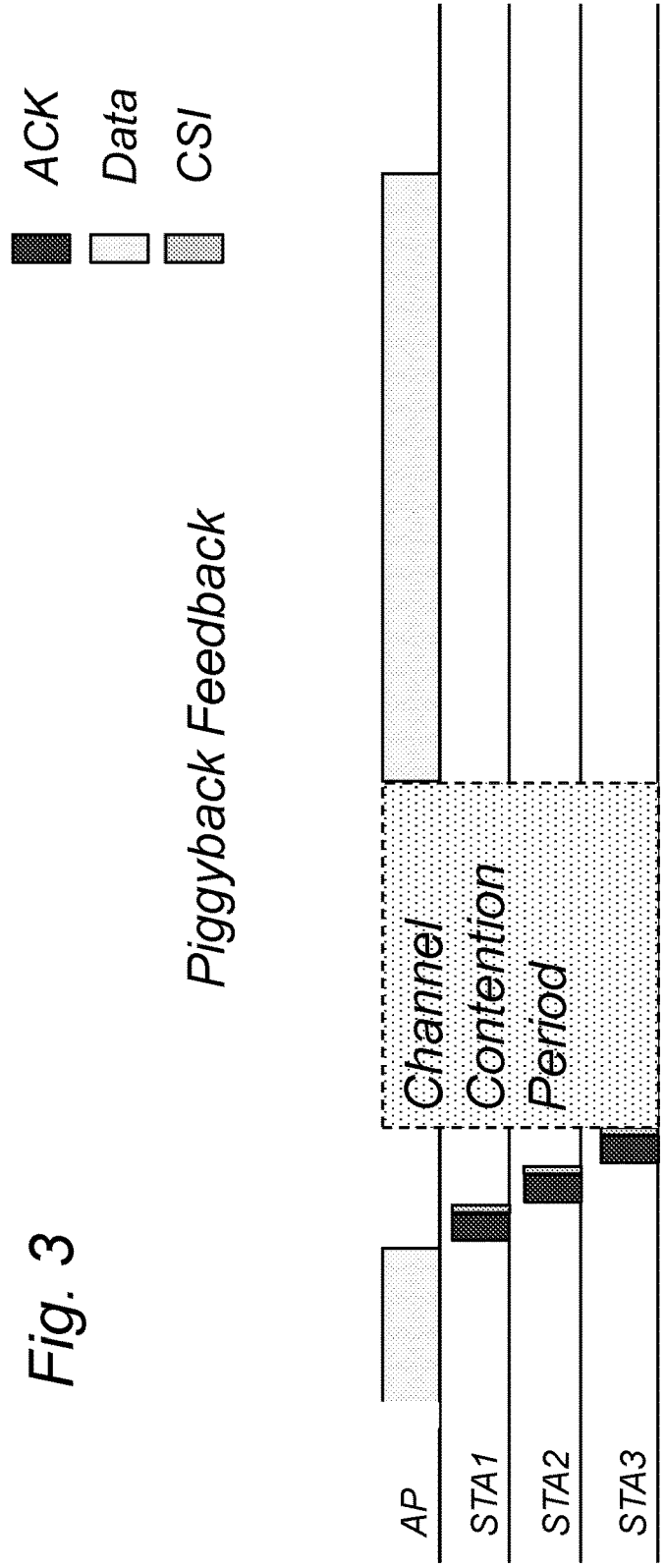
FIG. 3 is a schematic diagram illustrating an example of a PIGGYBACK feedback mechanism for acquiring channel state feedback.
Figure 4:
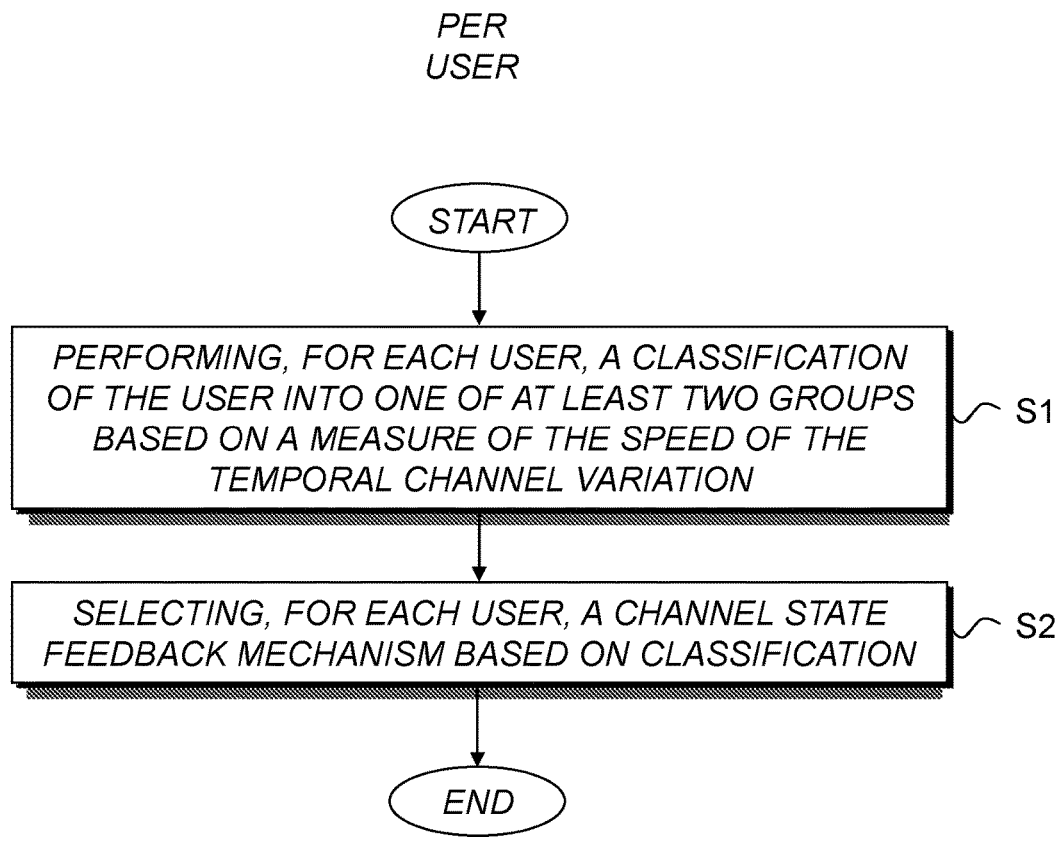
FIG. 4 is a schematic flow diagram illustrating an example of a method for enabling channel state feedback for multi-user transmission in a wireless communication system according to an embodiment.

FIG. 4 is a schematic flow diagram illustrating an example of a method for enabling channel state feedback for multi-user transmission in a wireless communication system according to an embodiment.

Basically, the method comprises:

S1: performing, for each of a number of users, a classification of the user into one of at least two groups based on a measure of the speed of the temporal channel variation for the user; and S2: selecting, for each of the users, a channel state feedback mechanism based on the classification.

By way of example, the at least two groups include a FAST variation group and a SLOW variation group.

Preferably, the channel state feedback mechanism is selected, for each user, among a number of different channel state feedback mechanisms.

For example, the different channel state feedback mechanisms include a POLL feedback mechanism and a PIGGYBACK feedback mechanism.

In a particular example, the POLL feedback mechanism is selected for a user in a group with fast temporal channel variation, and the PIGGYBACK feedback mechanism is selected for a user in a group with slow temporal channel variation.

As an example, for each of the users, information representative of the temporal channel variation of a channel between a multi-user transmission network node and the respective user is obtained, and the classification is performed based on how fast the channel varies in time.

In an optional embodiment, the information representative of the temporal channel variation is obtained by estimating the temporal channel variation at the multi-user transmission network node.

In an alternative embodiment, the information representative of the temporal channel variation is obtained from each of the users.

By way of example, the information representative of the temporal channel variation may be received in a CHANNEL VARIATION REPORT.

For example, the information representative of the temporal channel variation may be received in a management frame.

Alternatively, the information representative of the temporal channel variation may be received in a Medium Access Control, MAC, header of a packet from the user.

As an example, the obtained information representative of the temporal channel variation may include an estimate of the temporal channel variation measured at the user side.

Alternatively, the obtained information representative of the temporal channel variation includes an indication of how fast the channel varies in time.

In a particular example, the multi-user transmission network node sends a message to a user for requesting the information representative of the temporal channel variation from the user.

In another example, the multi-user transmission network node sends a message to a user for configuring conditions for sending the information representative of the temporal channel variation from the user.

Optionally, the classification is performed based on comparing a measure of the speed of the temporal channel variation with at least one threshold, as will be exemplified later on.

Preferably, for each of the users, the selected channel state feedback mechanism is triggered to obtain channel state feedback information.

As an example, the selected channel state feedback mechanism is triggered by sending a request to the user side to initiate channel state feedback.

For example, the selected channel state feedback mechanism may be triggered by setting a CSI request field in a Medium Access Control, MAC, header of a packet to the user side.

By way of example, the measure of the speed of the temporal channel variation may be represented by Doppler spread, a rate of change of channel response in time and/or a measure of how fast a user is moving.

In a particular embodiment, the steps of performing a classification and selecting a channel state feedback mechanism based on the classification may be repeated at different time instances to enable dynamic switching, for each of the users, between different channel state feedback mechanisms over time.

As an example, the method may be performed by an access point or access controller for enabling channel state feedback for multi-user transmission to associated stations in a Wireless Local Area Network.

Although the proposed technology is generally applicable to any multi-user transmission scheme, the method may for example be performed for enabling channel state feedback for an Orthogonal Frequency Division Multiple Access, OFDMA, transmission with Frequency Selective Scheduling, FSS or for a Multi-User Multiple Input Multiple Output, MU-MIMO, transmission.

Figure 5:
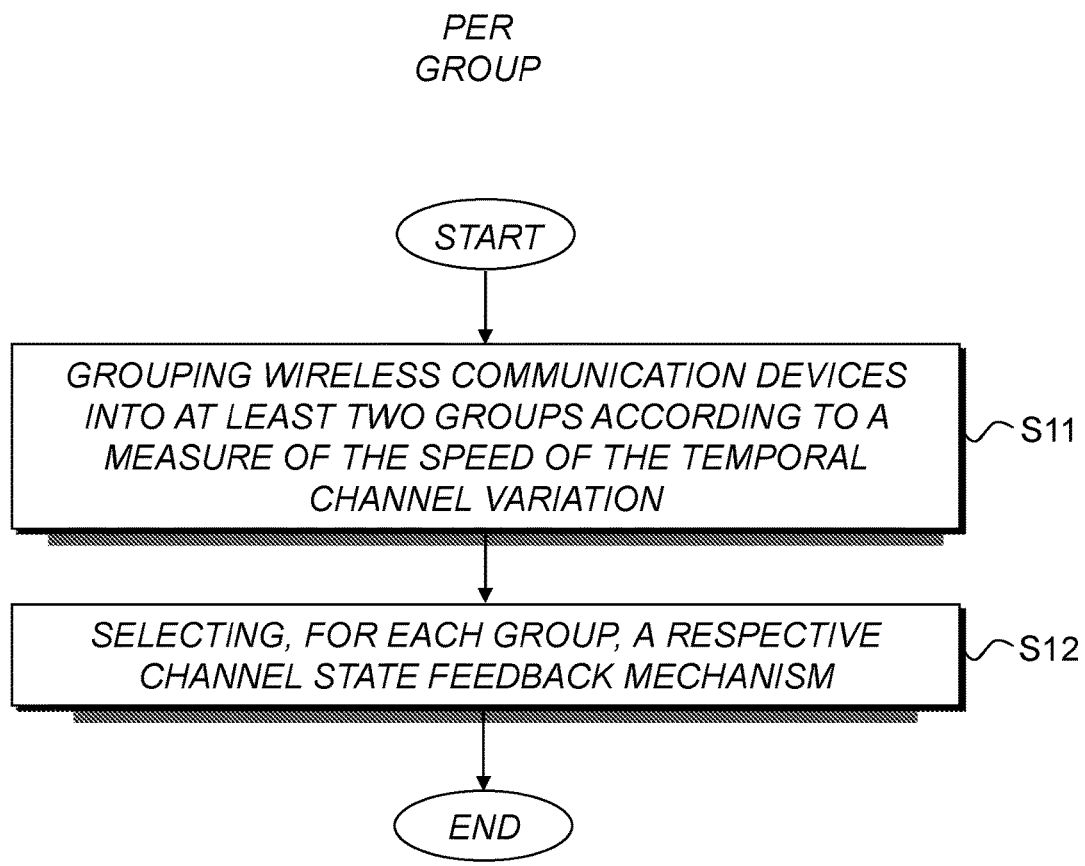
FIG. 5 is a schematic flow diagram illustrating an example of a method performed by a network node adapted for communication with a number of wireless communication devices in a wireless communication system according to an embodiment.

FIG. 5 is a schematic flow diagram illustrating an example of a method performed by a network node adapted for communication with a number of wireless communication devices in a wireless communication system according to an embodiment.

Basically, the method comprises:

S11: grouping the wireless communication devices into at least two groups according to a measure of the speed of the temporal channel variation of the wireless communication devices; and S12: selecting, for each group, a respective channel state feedback mechanism to acquire channel state information from the group of wireless communication devices.

By way of example, the at least two groups include a FAST variation group and a SLOW variation group.

Preferably, the channel state feedback mechanism may be selected, for each group, among a number of different channel state feedback mechanisms.

For example, the different channel state feedback mechanisms include a POLL feedback mechanism and a PIGGYBACK feedback mechanism.

In a particular example, the POLL feedback mechanism is selected for a group with fast temporal channel variation, and the PIGGYBACK feedback mechanism is selected for a group with slow temporal channel variation.

Typically, different channel state feedback mechanisms are assigned to different groups.

As an example, for each of the wireless communication devices, information representative of the temporal channel variation of a channel between the network node and the respective wireless communication device is obtained and the grouping comprises performing, for each of the wireless communication devices, a classification of the wireless communication device into one of the groups based on how fast the channel varies in time.

Optionally, for each group, the selected channel state feedback mechanism is triggered to obtain channel state feedback information.

Accordingly, multi-user transmission operation may be determined based on the obtained channel state feedback information to enable multi-user transmission to the wireless communication devices.

By way of example, the steps of grouping the wireless communication devices and selecting, for each group, a respective channel state feedback mechanism may be repeated at different time instances to enable dynamic switching, for each group, between different channel state feedback mechanisms over time.

Figure 6:
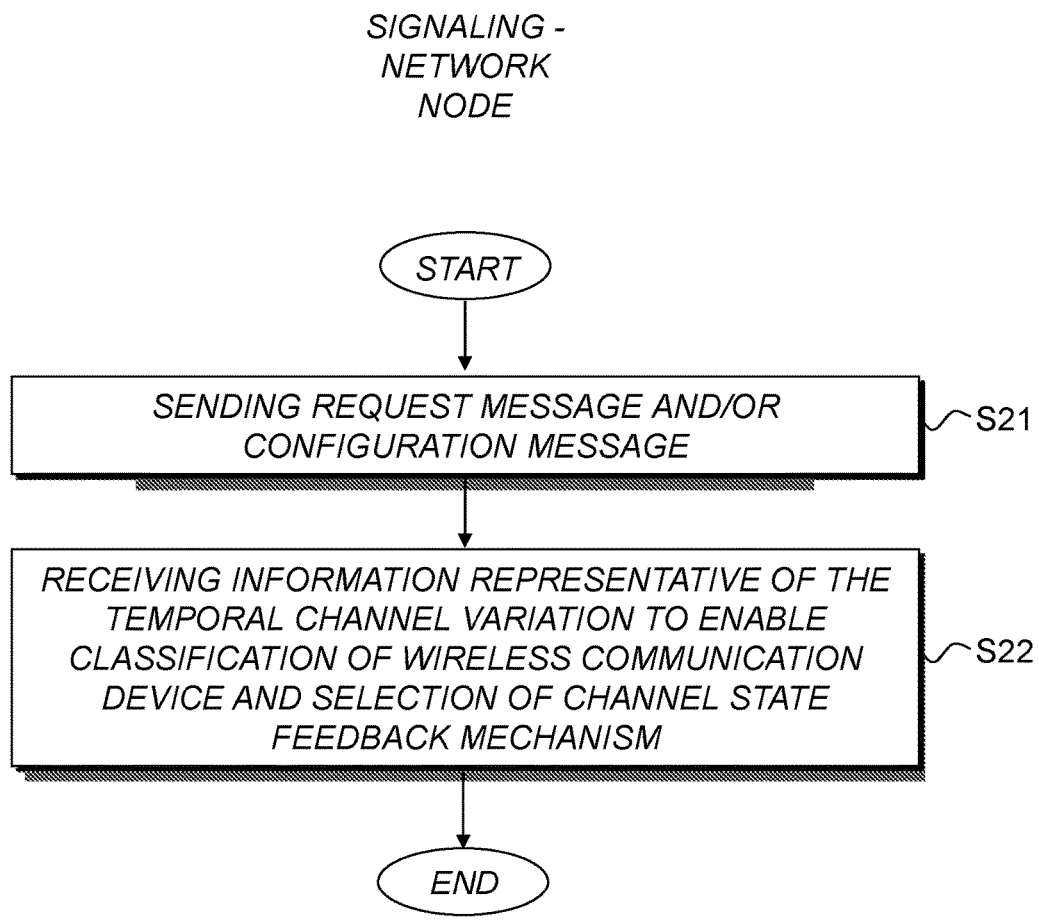
FIG. 6 is a schematic flow diagram illustrating an example of a method, performed by a network node, for enabling channel state feedback in a wireless communication system according to an embodiment.

FIG. 6 is a schematic flow diagram illustrating an example of a method, performed by a network node, for enabling channel state feedback in a wireless communication system according to an embodiment.

Basically, the method comprises:

S21: sending, to a wireless communication device, i) a request message for requesting information representative of temporal channel variation from the wireless communication device and/or ii) a configuration message for configuring conditions for the wireless communication device to send the information representative of the temporal channel variation; and S22: receiving information representative of the temporal channel variation from the wireless communication device to enable classification of the wireless communication device into one of at least two groups based on a measure of the speed of the temporal channel variation for the wireless communication device and selection of a channel state feedback mechanism based on the classification.

By way of example, the information representative of the temporal channel variation includes a representation of the measure of the speed of the temporal channel variation.

For example, the representation of the measure of the speed of the temporal channel variation may include a bit indicating whether the channel varies fast or slow.

In a particular example, the information representative of the temporal channel variation is received in a management frame.

In another example, the information representative of the temporal channel variation is received in a Medium Access Control, MAC, header of a packet from the wireless communication device.

The request message and/or configuration message may be sent in a management frame.

Alternatively, the request message and/or configuration message is sent in a Medium Access Control, MAC, header of a packet from the wireless communication device.

Figure 7:
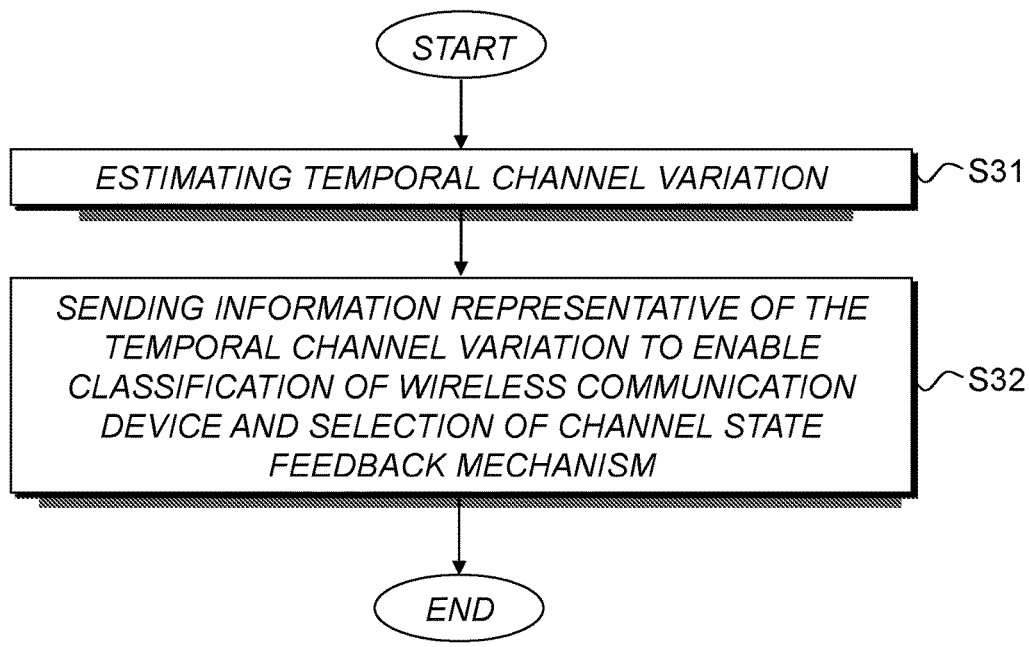
FIG. 7 is a schematic flow diagram illustrating an example of a method, performed by a wireless communication device, for enabling channel state feedback in a wireless communication system according to an embodiment.

FIG. 7 is a schematic flow diagram illustrating an example of a method, performed by a wireless communication device, for enabling channel state feedback in a wireless communication system according to an embodiment.

Basically, the method comprises:

S31: estimating temporal channel variation for a channel between a network node and the wireless communication device; and S32: sending information representative of the temporal channel variation to the network node to enable classification of the wireless communication device into one of at least two groups based on a measure of the speed of the temporal channel variation for the wireless communication device and selection of a channel state feedback mechanism based on the classification.

By way of example, the information representative of the temporal channel variation includes a representation of a measure of the speed of the temporal channel variation.

For example, the representation of a measure of the speed of the temporal channel variation includes a bit indicating whether the channel varies fast or slow.

Optionally, the information representative of the temporal channel variation is sent in a management frame.

Alternatively, the information representative of the temporal channel variation is sent in a Medium Access Control, MAC, header of a packet from the wireless communication device.

In a particular example, the wireless communication device receives i) a request message for requesting information representative of temporal channel variation from the wireless communication device and/or ii) a configuration message for configuring conditions for the wireless communication device to send the information representative of the temporal channel variation.

As an example, the request message and/or configuration message is received in a management frame.

Alternatively, the request message and/or configuration message is received in a Medium Access Control, MAC, header of a packet from the wireless communication device.

It should though be understood that the wireless communication device may have preconfigured conditions for sending the information representative of the temporal channel variation.

Figure 8:
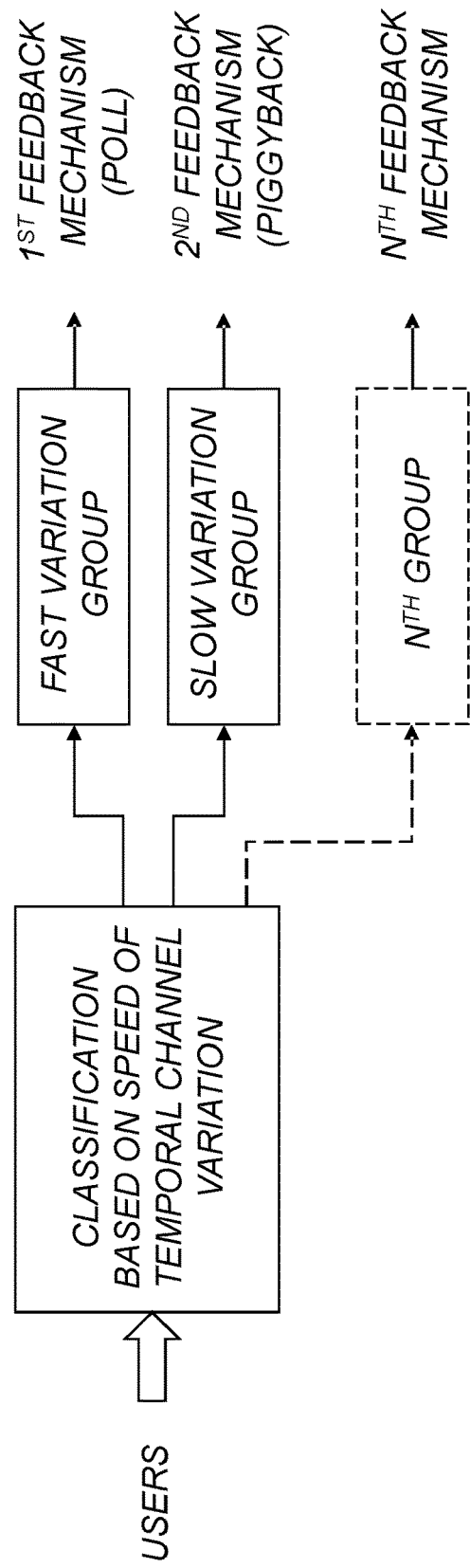
FIG. 8 is a schematic diagram illustrating an example of classification of users into groups based on a measure representative of the speed of the temporal channel variation and selection, for each group, of a respective channel state feedback mechanism.

FIG. 8 is a schematic diagram illustrating an example of classification of users into groups based on a measure representative of the speed of the temporal channel variation and selection, for each group, of a respective channel state feedback mechanism.

In the example of FIG. 8, a number of users are classified into a number N of groups based on a measure representative of temporal channel variation speed, where N is an integer value equal to or greater than two. The groups may include a FAST variation group and a SLOW variation group, but may involve further groups if desired.

A respective channel state feedback mechanism is then selected for each group. By way of example, a first feedback mechanism such as POLL is selected for the FAST variation group, and a second feedback mechanism such as PIGGYBACK is selected for the slow variation group, and so on until the $N^{TH}$ group for which a $N^{TH}$ feedback mechanism is selected.

Figure 9:
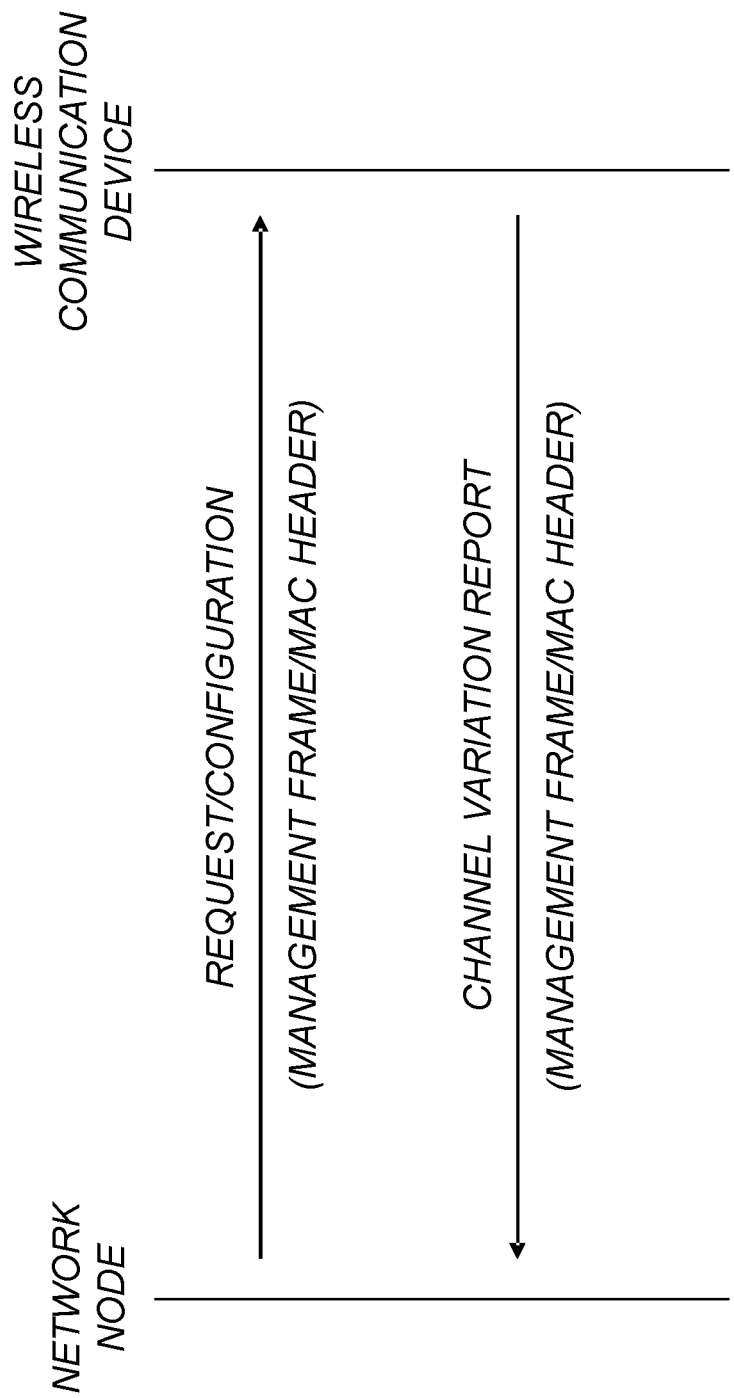
FIG. 9 is a schematic signaling diagram illustrating an example of relevant parts of the signaling between a network node and a wireless communication device for enabling channel state feedback.

FIG. 9 is a schematic signaling diagram illustrating an example of relevant parts of the signaling between a network node and a wireless communication device for enabling channel state feedback.

As previously indicated, a request message and/or configuration message may be sent from the network node to the wireless communication device. The message(s) may for example be sent in a management frame or as part of a MAC header.

The request message is for requesting information representative of temporal channel variation from the wireless communication device. The configuration message is for configuring conditions for the wireless communication device to send the information representative of the temporal channel variation.

A channel variation report that includes information representative of the temporal channel variation may then be sent from the wireless communication device to the network node. This report enables classification of the wireless communication device into one of at least two groups based on a measure of the speed of the temporal channel variation for the wireless communication device and selection of a channel state feedback mechanism based on the classification.

In the following, the proposed technology will be described with reference to a number of non-limiting examples.

By way of example, Frequency Selective Scheduling (FSS) for DL-OFDMA transmission requires channel state information (CSI) feedback (FB) from wireless communication devices. Internal studies have shown a tradeoff between FB overhead and latency when applying different types of feedback alternatives. In an optional embodiment, there is proposed a method that exploits the tradeoff by switching between CSI FB alternatives in order to minimize the overhead while maintaining the quality of the CSI. By way of example, the method takes explicit or implicit channel variation speed as input and selects a CSI FB mechanism accordingly.

For example, the proposed method may be able to minimize CSI FB overhead while ensuring the quality of the CSI, hence improving system efficiency.

Figure 10:
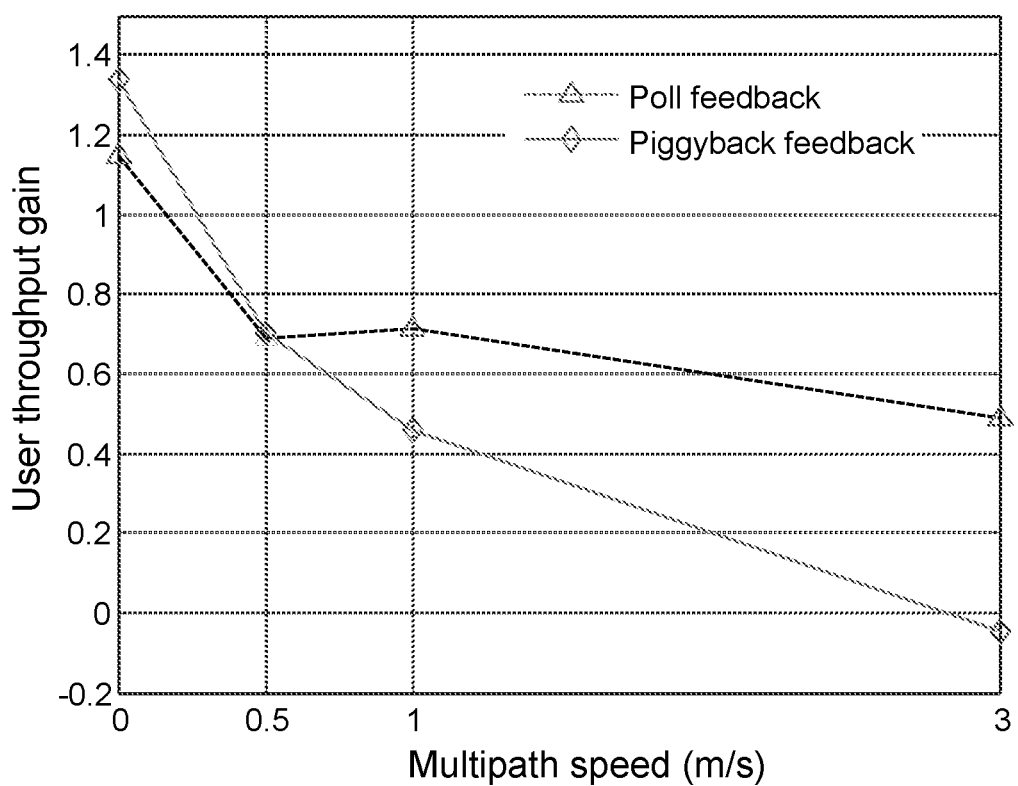
FIG. 10 is a schematic curve diagram illustrating an example of simulation results of user throughput gain by using FSS with poll feedback and piggyback feedback, respectively, compared to no FSS at different multipath speeds.

FIG. 10 is a schematic curve diagram illustrating an example of simulation results of user throughput gain by using FSS with poll feedback and piggyback feedback, respectively, compared to no FSS at different multipath speeds. The multipath speed represents the speed of channel temporal variation. It is apparent that no single feedback mechanism provides the highest gain at all multipath speeds. The inventors have recognized that switching between the mechanisms will yield the optimum performance.

In a sense, the proposed technology suggests a method that enables switching among different CSI FB mechanisms based on an explicit or implicit measure or representation of channel variation speed.

Figure 11:
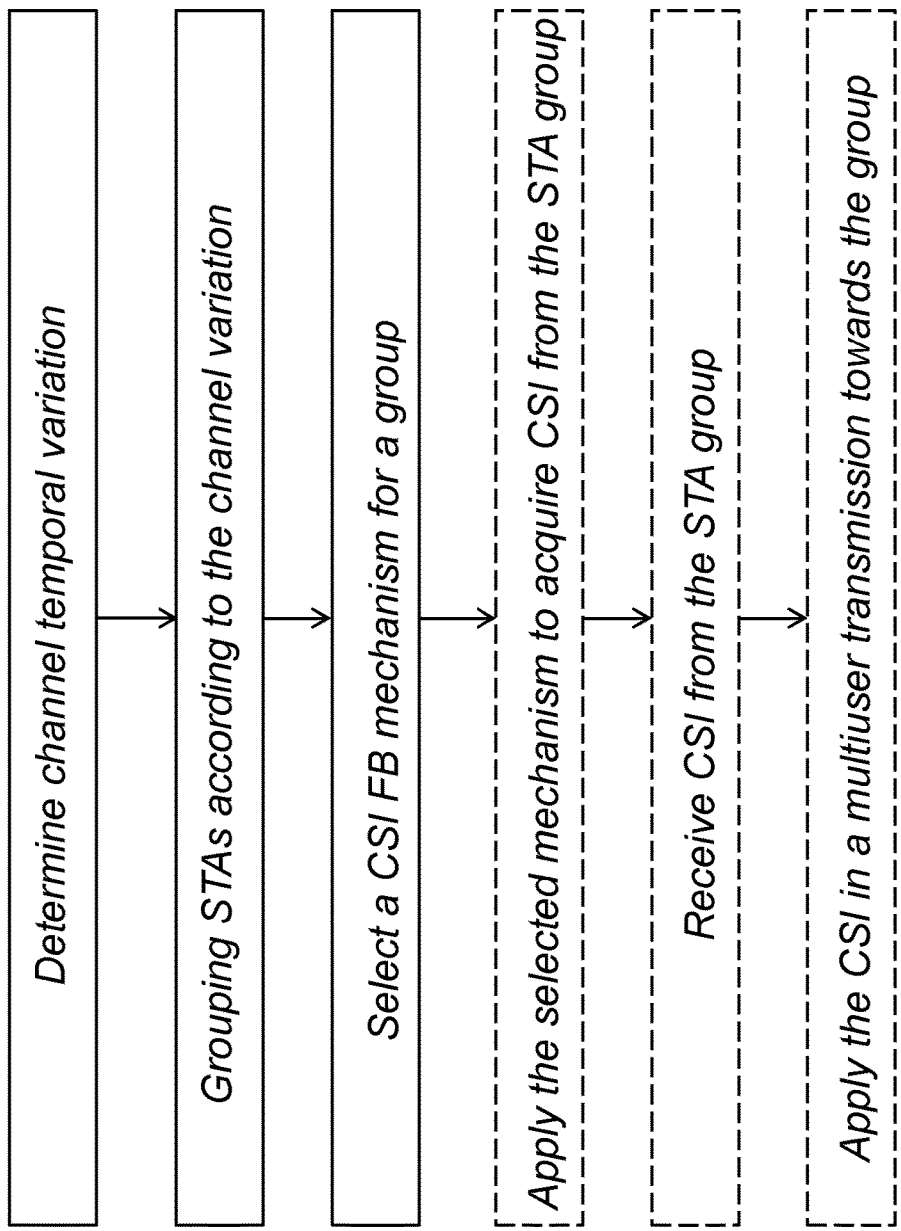
FIG. 11 is a schematic flow diagram illustrating a particular example of a method for enabling channel state feedback for multi-user transmission in a wireless communication system according to an alternative embodiment.

In the following, the proposed technology will be described with reference to particular non-limiting examples, often referring to access points, APS, and stations, STAs in WLAN systems. The invention is not limited thereto and applicable to multi-user transmission scenarios in any wireless communication system FIG. 11 is a schematic flow diagram illustrating a particular example of a method for enabling channel state feedback for multi-user transmission in a wireless communication system according to an alternative embodiment.

By way of example, the method may be implemented in a network node, e.g. a WLAN AP, which uses CSI FB from multiple wireless communication devices, e.g. WLAN STAs, for multi-user transmission, e.g. FSS DL OFDMA transmission. In the following text, the AP and STAs are used to represent the communication entities involved, but the proposed technology is not limited thereto. In this example, the method is applied when the AP intends to initiate a DL OFDMA transmission with FSS towards the multiple STAs.

In a first step, the AP may determine or otherwise obtain information representative of temporal channel variation between the AP and the STAs. According to the channel variation speed, the STAs may be classified into several groups, e.g. fast variation and slow variation groups. After the grouping, the AP may select a respective suitable CSI FB mechanism for each group to minimize feedback overhead while the latency is sufficiently short to avoid obsolete CSI. The AP may then apply the selected mechanism for the STA group and acquire CSI from the STAs. After receiving the CSI from the STAs, the AP may apply the CSI for a multi-user transmission towards the STAs, e.g. a DL OFDMA transmission with FSS.

Examples of measures representative of temporal channel variation speed include Doppler spread and a rate of change in channel response over time and/or a measure of how fast a user is moving. In the latter case, STA mobility may be used as an indirect measure of the channel variation speed, i.e. high mobility STAs most probably experience fast channel variation.

The temporal channel variation, i.e. the channel variation in time, can be measured at the AP on UL transmissions using the fact that the channel variations in the UL can be used to predict the channel variations in the DL. In case of a TDD system, the channel variations may be assumed to be the same due to channel reciprocity, whereas in a FDD systems where the UL and DL are using different carrier frequencies, the channel variations for the DL can be easily estimated taking the difference in carrier frequency into account as the channel variations may be assumed to be proportional to the carrier frequency.

Alternatively, the channel variations can be measured at the STAs. When measured at the STAs, information representative of the temporal channel variation needs to be sent to the AP from the STAs. In an example embodiment, information about the temporal channel variation may be sent to the AP. In another embodiment, information representative of the speed of the temporal channel variation may be sent to the AP. For example, an estimate of the channel variation speed may be mapped to a channel variation speed indicator indicating the level of the channel variation speed, where the indicator is sent to the AP.

Once information representative of the temporal channel variation is obtained, the AP may classify the STAs into groups based on how fast the channel changes in time. In a particular example, two groups can be defined, i.e. a FAST Variation group and a SLOW Variation group.

An example of a classification rule may be specified as:

If Doppler Spread>DS_Threshold, then FAST Variation group; otherwise, SLOW Variation group Other measures of channel variation speed may be applied for the grouping and a larger number of groups may be defined instead of the exemplified FAST Variation and SLOW Variation groups. With more groups, additional thresholds may be defined. For example, with three groups of different temporal channel variation speeds, such as LOW, MEDIUM, HIGH, two threshold values would be sufficient to differentiate between the three groups.

For each group, the AP may select a suitable channel state feedback mechanism, for example to minimize feedback overhead while ensuring the obtained CSI will not be obsolete.

To avoid the CSI to be out-of-date, a channel state feedback mechanism with shorter latency should be selected for a STA group with faster channel variation. The latency of a channel state feedback mechanism is represented by the time gap between the time the CSI is estimated and its actual use in a later transmission.

Two examples of channel state feedback mechanism include POLL feedback and PIGGYBACK feedback, as previously mentioned. The Poll feedback has shorter latency and higher overhead comparing to the Piggyback feedback.

In a particular example, Poll feedback is selected for the FAST Variation group, and Piggyback feedback is selected for the SLOW Variation group.

The selected channel state feedback mechanism may then be applied to obtain the CSI from the STAs in the corresponding STA group. The obtained CSI may be used for various purposes. In one example, the CSI is used for DL OFDMA transmission with FSS.

Figure 12:
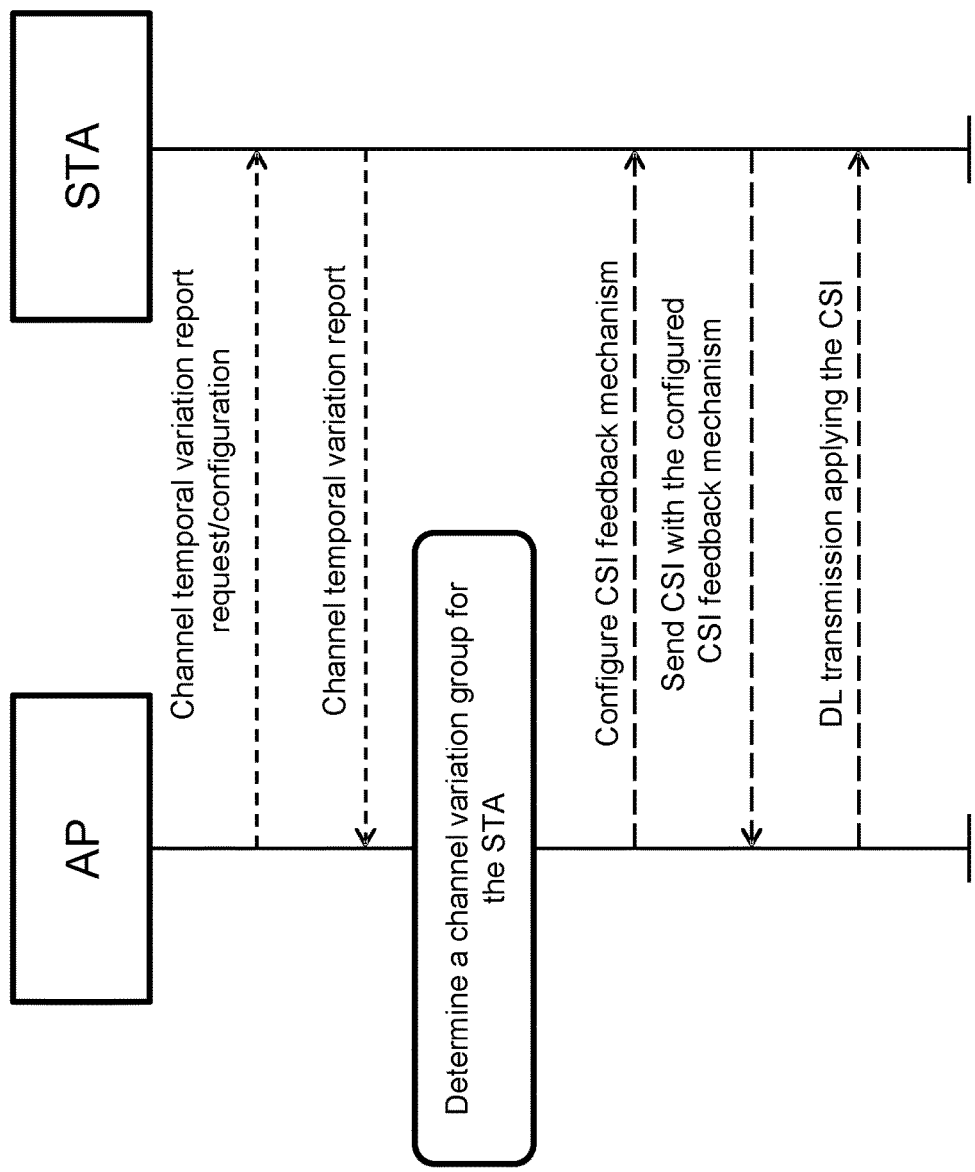
FIG. 12 is a schematic signaling diagram illustrating an example of relevant parts of the signaling between an access point and a station for enabling channel state feedback.

FIG. 12 is a schematic signaling diagram illustrating an example of relevant parts of the signaling between an access point and a station for enabling channel state feedback.

The AP may send a message to the STA to either request or configure a temporal channel variation report. In one embodiment, the message is an explicit request to order the STA to send the channel temporal variation report. In another embodiment, the message configures the STA to send the report under certain conditions. Such conditions may for example include the occurrence of a certain event, e.g. changes in temporal channel variation or the measure of temporal channel variation speed becomes higher than a threshold. In this case, the report is event triggered. The report may also be periodic and the period may be configured by the configuration message sent from the AP.

Upon the reception of the request or configuration message, the STA sends the report to the AP. The report includes the temporal channel variation information measured at the STA or a representation thereof. In one embodiment, the report contains binary information, i.e. indicating FAST or SLOW channel variation. The report may be sent separately, e.g. as a management frame, or combined with other packets, e.g. in the MAC header of any packets sent from the STA to the AP.

The AP then determines a channel variation group for the STA. In one embodiment, the determination is based on the STA report. In another embodiment, the AP measures the temporal channel variation between the AP and the STA itself.

Once the group is decided, the AP may configure a CSI feedback mechanism to the STA. In one embodiment, when the STA belongs to the FAST variation group, the AP starts an explicit CSI feedback procedure to poll the CSI from the STA and apply the feedback immediately in DL transmission. In another embodiment, when the STA belongs to the SLOW variation group, the AP requests CSI by setting a CSI request field in the MAC header of a packet sent to the STA. The STA may piggyback the CSI with a data or control frame sent to the AP with certain delay. Then the AP applies the CSI in DL transmission in the next DL transmission which possibly requires additional channel contention procedures. It should be noted the AP may configure the CSI feedback mechanism for a number of STAs which belong to the same group at the same time.

It will be appreciated that the methods and arrangements described herein can be implemented, combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Alternatively, or as a complement, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

According to an aspect of the proposed technology there is provided a device configured to enable channel state feedback for multi-user transmission in a wireless communication system. The device is configured to perform, for each of a number of users, a classification of the user into one of at least two groups based on a measure of the speed of the temporal channel variation for the user. The device is also configured to select, for each of the users, a channel state feedback mechanism based on the classification.

By way of example, the device is configured to perform the classification into at least two groups including a FAST variation group and a SLOW variation group.

Preferably, the device is configured to select, for each user, the channel state feedback mechanism among a number of different channel state feedback mechanisms.

For example, the different channel state feedback mechanisms include a POLL feedback mechanism and a PIGGYBACK feedback mechanism.

In a particular example, the device is configured to select the POLL feedback mechanism for a user in a group with fast temporal channel variation, and select the PIGGYBACK feedback mechanism for a user in a group with slow temporal channel variation.

Optionally, the device is configured to trigger, for each of the users, the selected channel state feedback mechanism to obtain channel state feedback information.

As an example, the device may be configured to enable channel state feedback for an Orthogonal Frequency Division Multiple Access, OFDMA, transmission with Frequency Selective Scheduling, FSS or for a Multi-User Multiple Input Multiple Output, MU-MIMO, transmission.

Figure 13A:
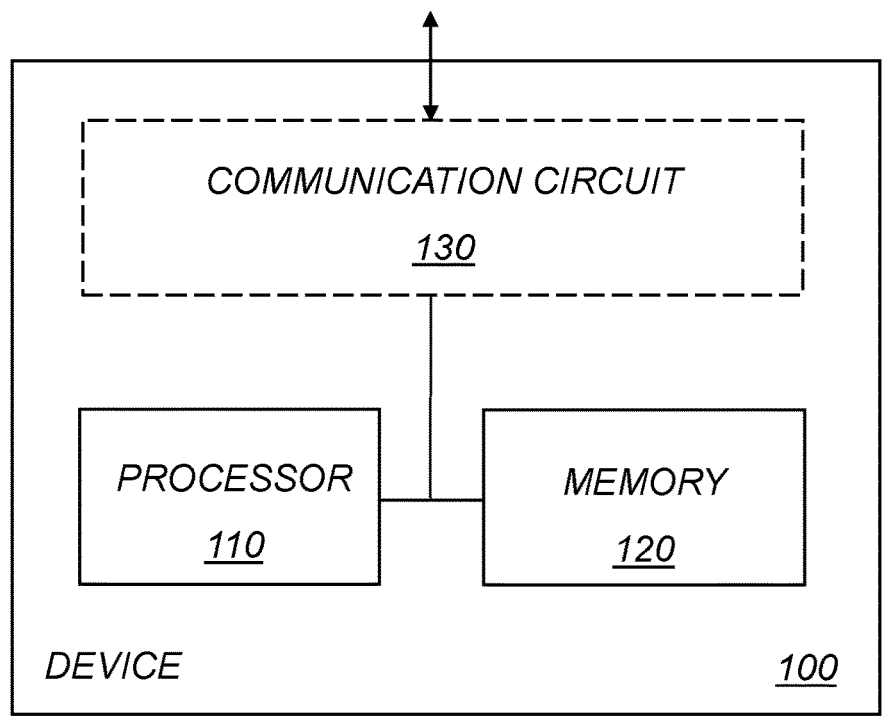
FIG. 13A is a schematic block diagram illustrating an example of a device configured to enable channel state feedback for multi-user transmission in a wireless communication system according to an embodiment.

FIG. 13A is a schematic block diagram illustrating an example of a device 100 configured to enable channel state feedback for multi-user transmission in a wireless communication system according to an embodiment. In this example, the device is based on a processor-memory implementation, and the device 100 comprises a processor 110 and a memory 120, the memory 120 comprising instructions executable by the processor 110, whereby the processor is operative to enable channel state feedback for multi-user transmission.

Figure 13B:
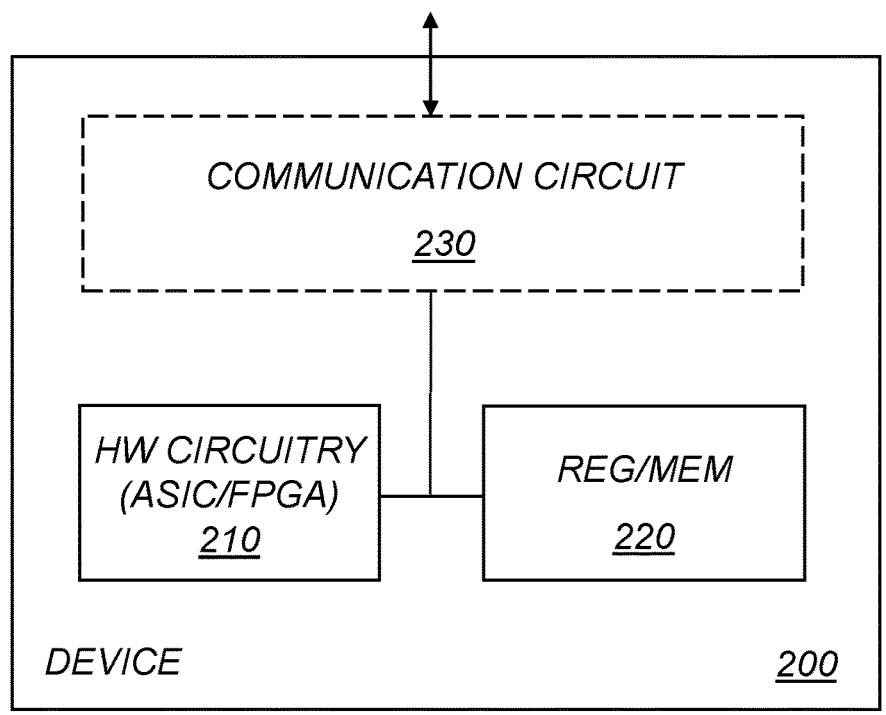
FIG. 13B is a schematic block diagram illustrating another example of a device configured to enable channel state feedback for multi-user transmission in a wireless communication system according to an alternative embodiment.

FIG. 13B is a schematic block diagram illustrating another example of a device 200 configured to enable channel state feedback for multi-user transmission in a wireless communication system according to an alternative embodiment. In this example, the device 200 is based on a hardware circuitry implementation. Particular examples of suitable hardware circuitry 210 include one or more suitably configured or possibly reconfigurable electronic circuitry, e.g. Application Specific Integrated Circuits (ASICs), Field Programmable Gate Arrays (FPGAs), or any other hardware logic such as circuits based on discrete logic gates and/or flip-flops interconnected to perform specialized functions in connection with suitable registers (REG) and/or memory units (MEM) 220.

Optionally, the device 100; 200 may also include a communication circuit 130; 230. The communication circuit 130; 230 may include functions for wired and/or wireless communication with other devices and/or network nodes in the network. In a particular example, the communication circuit 130; 230 may be based on radio circuitry for communication with one or more other nodes, including transmitting and/or receiving information. The communication circuit 130 may be interconnected to the processor 110 and/or memory 120. The communication circuit 230 may be interconnected to the hardware circuitry 210 and/or REG/MEM 220. By way of example, the communication circuit 130; 230 may include any of the following: a receiver, a transmitter, a transceiver, input/output (I/O) circuitry, input port(s) and/or output port(s).

It is also possible to provide a solution based on a combination of hardware and software. The actual hardware-software partitioning can be decided by a system designer based on a number of factors including processing speed, cost of implementation and other requirements.

Figure 14:
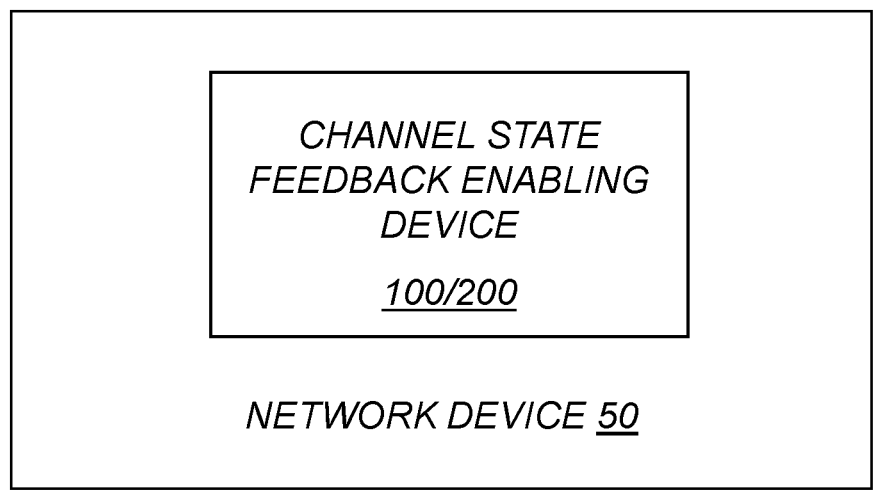
FIG. 14 is a schematic block diagram illustrating an example of a network device comprising a device configured to enable channel state feedback.

FIG. 14 is a schematic block diagram illustrating an example of a network device comprising a device configured to enable channel state feedback. The network device 50 comprises a channel state feedback enabling device 100; 200 as described herein.

The network device may be any suitable network device in the wireless communication system, or a network device in connection with the wireless communication system. By way of example, the network device may be implemented in a suitable network node of the wireless communication system such a base station or an access point. However, the network device may alternatively be a cloud-based network device.

According to another aspect, there is provided a network node adapted for communication with a number of wireless communication devices in a wireless communication system. The network node is configured to group the wireless communication devices into at least two groups according to a measure of the speed of the temporal channel variation of the wireless communication devices. The network node is also configured to select, for each group, a respective channel state feedback mechanism to acquire channel state information from the group of wireless communication devices.

As an example, the network node is configured to group the wireless communication devices into at least two groups including a FAST variation group and a SLOW variation group.

Preferably, the network node may be configured to select, for each group, the channel state feedback mechanism among a number of different channel state feedback mechanisms.

For example, the different channel state feedback mechanisms may include a POLL feedback mechanism and a PIGGYBACK feedback mechanism.

In a particular example, the network node is configured to select the POLL feedback mechanism for a group with fast temporal channel variation, and select the PIGGYBACK feedback mechanism for a group with slow temporal channel variation.

Optionally, the network node may be an access point or access controller configured to enable channel state feedback for multi-user transmission to associated stations in a Wireless Local Area Network.

According to yet another aspect, there is provided a network node configured to enable channel state feedback in a wireless communication system. The network node is configured to send, to a wireless communication device, i) a request message for requesting information representative of temporal channel variation from the wireless communication device and/or ii) a configuration message for configuring conditions for the wireless communication device to send the information representative of the temporal channel variation. The network node is configured to receive information representative of the temporal channel variation from the wireless communication device to enable classification of the wireless communication device into one of at least two groups based on a measure of the speed of the temporal channel variation for the wireless communication device and selection of a channel state feedback mechanism based on the classification.

Figure 15A:
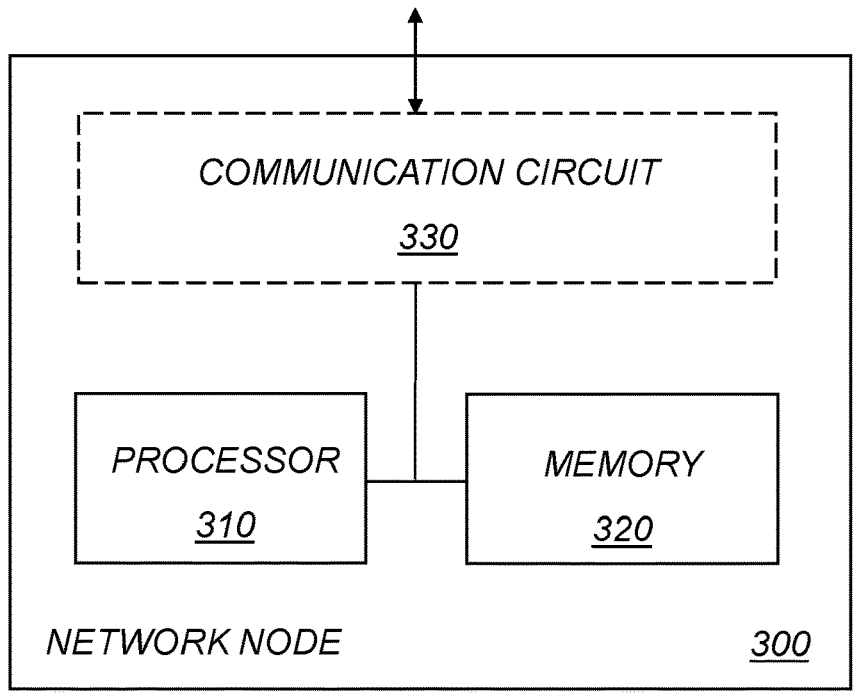
FIG. 15A is a schematic block diagram illustrating an example of a network node according to an embodiment.

FIG. 15A is a schematic block diagram illustrating an example of a network node 300 according to an embodiment. In this example, the network node 300 is based on a processor-memory implementation, and the network node 300 comprises a processor 310 and a memory 320, the memory 320 comprising instructions executable by the processor 310, whereby the processor is operative to enable channel state feedback.

Figure 15B:
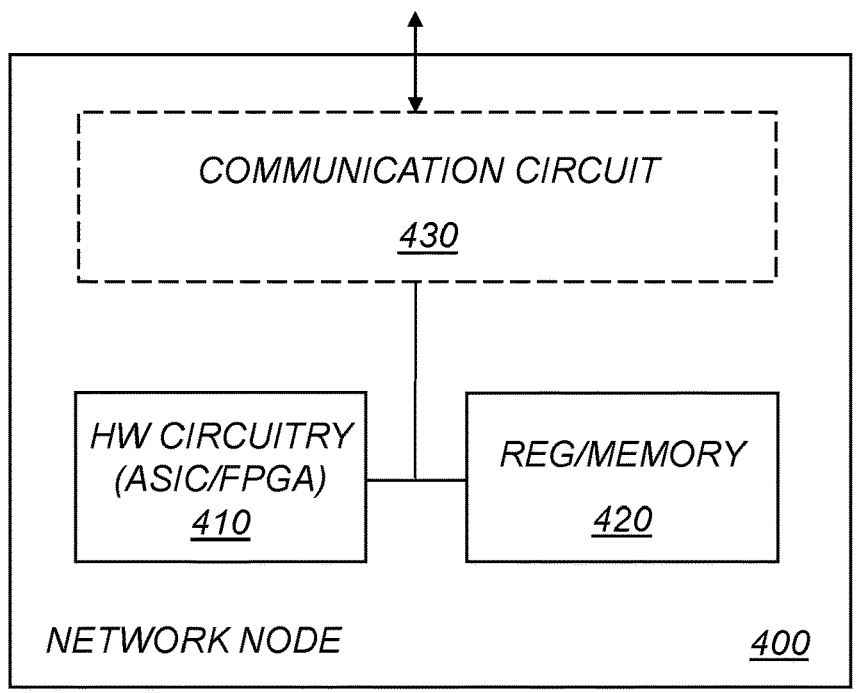
FIG. 15B is a schematic block diagram illustrating another example of a network node according to an alternative embodiment.

FIG. 15B is a schematic block diagram illustrating another example of a network node 400 according to an alternative embodiment. In this example, the network node 400 is based on a hardware circuitry implementation. Particular examples of suitable hardware circuitry 410 include one or more suitably configured or possibly reconfigurable electronic circuitry, e.g. Application Specific Integrated Circuits (ASICs), Field Programmable Gate Arrays (FPGAs), or any other hardware logic such as circuits based on discrete logic gates and/or flip-flops interconnected to perform specialized functions in connection with suitable registers (REG) and/or memory units (MEM) 420.

The network node 300; 400 may also include a communication circuit 330; 430. The communication circuit 330; 430 may include functions for wired and/or wireless communication with other devices and/or network nodes in the network. In a particular example, the communication circuit 330; 430 may be based on radio circuitry for communication with one or more other nodes, including transmitting and/or receiving information.

According to a further aspect, there is also provided a wireless communication device configured to enable channel state feedback in a wireless communication system. The wireless communication device is configured to estimate temporal channel variation for a channel between a network node and the wireless communication device. The wireless communication device is also configured to send information representative of the temporal channel variation to the network node to enable classification of the wireless communication device into one of at least two groups based on a measure of the speed of the temporal channel variation for the wireless communication device and selection of a channel state feedback mechanism based on the classification.

For examples of suitable implementation of a wireless communication device, reference can be made to the schematic block diagrams of FIG. 13A and FIG. 13B.

Figure 16:
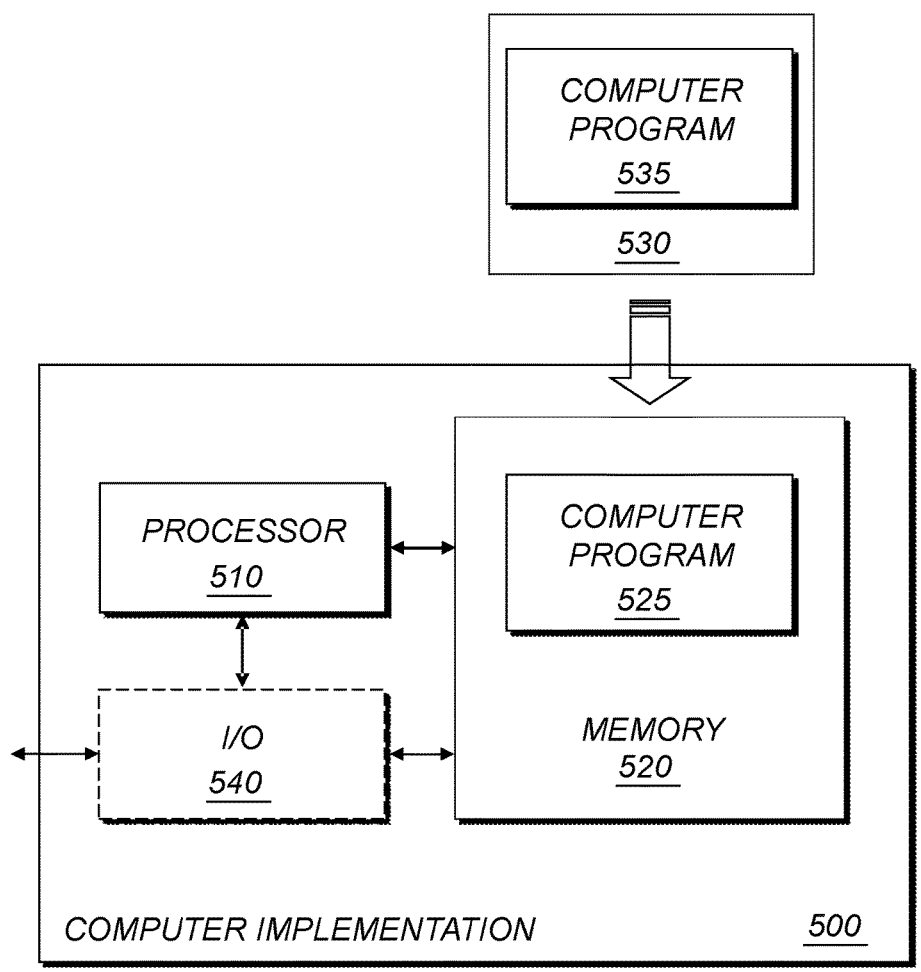
FIG. 16 is a schematic block diagram illustrating an example of a computer implementation according to an embodiment.

FIG. 16 is a schematic block diagram illustrating an example of a computer implementation 500 according to an embodiment. In this particular example, at least some of the steps, functions, procedures, modules and/or blocks described herein are implemented in a computer program 525; 535, which is loaded into the memory 520 for execution by processing circuitry including one or more processors 510. The processor(s) 510 and memory 520 are interconnected to each other to enable normal software execution. An optional input/output device 540 may also be interconnected to the processor(s) 510 and/or the memory 520 to enable input and/or output of relevant data such as input parameter(s) and/or resulting output parameter(s).

The term 'processor' should be interpreted in a general sense as any system or device capable of executing program code or computer program instructions to perform a particular processing, determining or computing task.

The processing circuitry including one or more processors 510 is thus configured to perform, when executing the computer program 525, well-defined processing tasks such as those described herein.

The processing circuitry does not have to be dedicated to only execute the above-described steps, functions, procedure and/or blocks, but may also execute other tasks.

In a particular embodiment, there is provided a computer program 525; 535 for enabling, when executed, channel state feedback for multi-user transmission in a wireless communication system. The computer program 525; 535 comprises instructions, which when executed by at least one processor 510, cause the at least one processor to:
  perform, for each of a number of users, a classification of the user into one of at least two groups based on a measure of the speed of the temporal channel variation for the user; and
  select, for each of the users, a channel state feedback mechanism based on the classification.

In another embodiment, there is provided a computer program 525; 535 comprising instructions, which when executed by at least one processor 510, cause the at least one processor to:
  group wireless communication devices into at least two groups according to a measure of the speed of the temporal channel variation of the wireless communication devices; and
  select, for each group, a respective channel state feedback mechanism to acquire channel state information from the group of wireless communication devices.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

By way of example, the software or computer program 525; 535 may be realized as a computer program product, which is normally carried or stored on a computer-readable medium 520; 530, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HOD) storage device, a flash memory, a magnetic tape, or any other conventional memory device. The computer program may thus be loaded into the operating memory of a computer or equivalent processing device for execution by the processing circuitry thereof.

The flow diagram or diagrams presented herein may be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

The computer program residing in memory may thus be organized as appropriate function modules configured to perform, when executed by the processor, at least part of the steps and/or tasks described herein.

Figure 17:
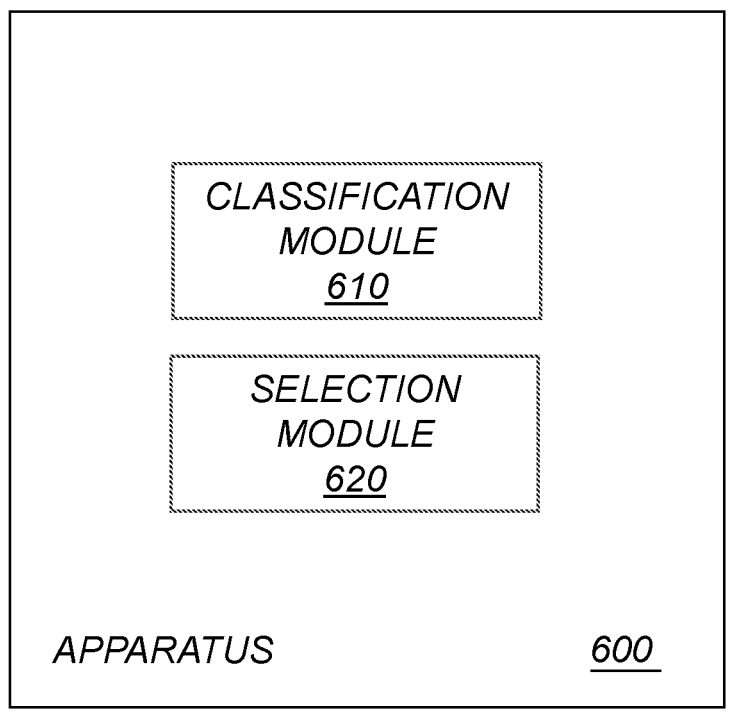
FIG. 17 is a schematic block diagram illustrating an example of an apparatus for enabling channel state feedback for multi-user transmission in a wireless communication system according to an embodiment.

FIG. 17 is a schematic block diagram illustrating an example of an apparatus for enabling channel state feedback for multi-user transmission in a wireless communication system according to an embodiment.

Basically, the apparatus 600 comprises:
- a classification module 610 for performing, for each of a number of users, a classification of the user into one of at least two groups based on a measure of the speed of the temporal channel variation for the user; and
- a selection module 620 for selecting, for each of the users, a channel state feedback mechanism based on the classification.

Figure 18:
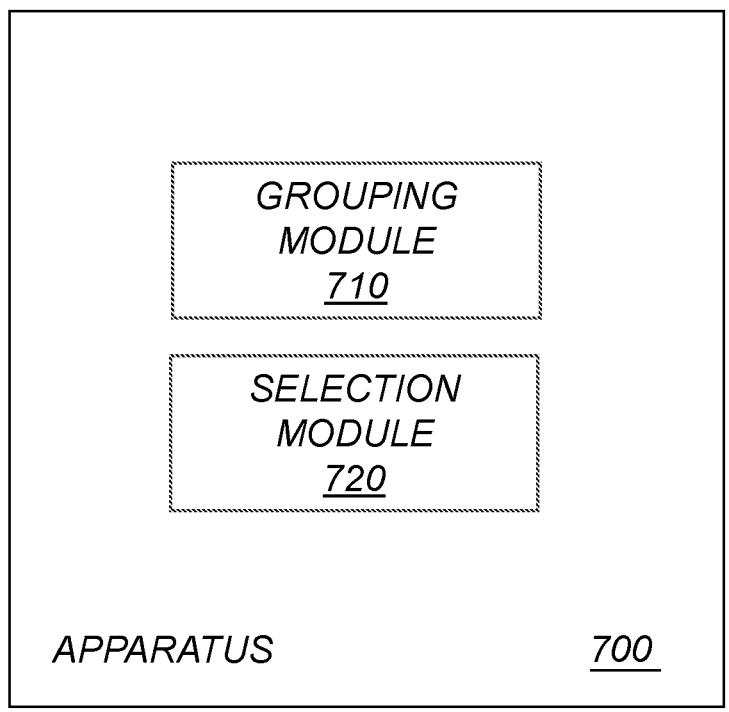
FIG. 18 is a schematic block diagram illustrating an example of an apparatus for enabling channel state feedback from wireless communication devices in a wireless communication system according to an embodiment.

FIG. 18 is a schematic block diagram illustrating an example of an apparatus for enabling channel state feedback from wireless communication devices in a wireless communication system according to an embodiment.

Basically, the apparatus comprises:
- a grouping module 710 for grouping the wireless communication devices into at least two groups according to a measure of the speed of the temporal channel variation of the wireless communication devices; and
- a selection module 720 for selecting, for each group, a respective channel state feedback mechanism to acquire channel state information from the group of wireless communication devices.

Alternatively it is possible to realize the module(s) in FIG. 17 and FIG. 18 predominantly by hardware modules, or alternatively by hardware, with suitable interconnections between relevant modules. Particular examples include one or more suitably configured digital signal processors and other known electronic circuits, e.g. discrete logic gates interconnected to perform a specialized function, and/or Application Specific Integrated Circuits (ASICs) as previously mentioned. Other examples of usable hardware include input/output (I/O) circuitry and/or circuitry for receiving and/or sending signals. The extent of software versus hardware is purely implementation selection.

It is becoming increasingly popular to provide computing services (hardware and/or software) in network devices such as network nodes and/or servers where the resources are delivered as a service to remote locations over a network. By way of example, this means that functionality, as described herein, can be distributed or re-located to one or more separate physical nodes or servers. The functionality may be re-located or distributed to one or more jointly acting physical and/or virtual machines that can be positioned in separate physical node(s), i.e. in the so-called cloud. This is sometimes also referred to as cloud computing, which is a model for enabling ubiquitous on-demand network access to a pool of configurable computing resources such as networks, servers, storage, applications and general or customized services.

There are different forms of virtualization that can be useful in this context, including one or more of:
- Consolidation of network functionality into virtualized software running on customized or generic hardware. This is sometimes referred to as network function virtualization.
- Co-location of one or more application stacks, including operating system, running on separate hardware onto a single hardware platform. This is sometimes referred to as system virtualization, or platform virtualization.
- Co-location of hardware and/or software resources with the objective of using some advanced domain level scheduling and coordination technique to gain increased system resource utilization. This is sometimes referred to as resource virtualization, or centralized and coordinated resource pooling.

Although it may often be desirable to centralize functionality in so-called generic data centers, in other scenarios it may in fact be beneficial to distribute functionality over different parts of the network.

Figure 19:
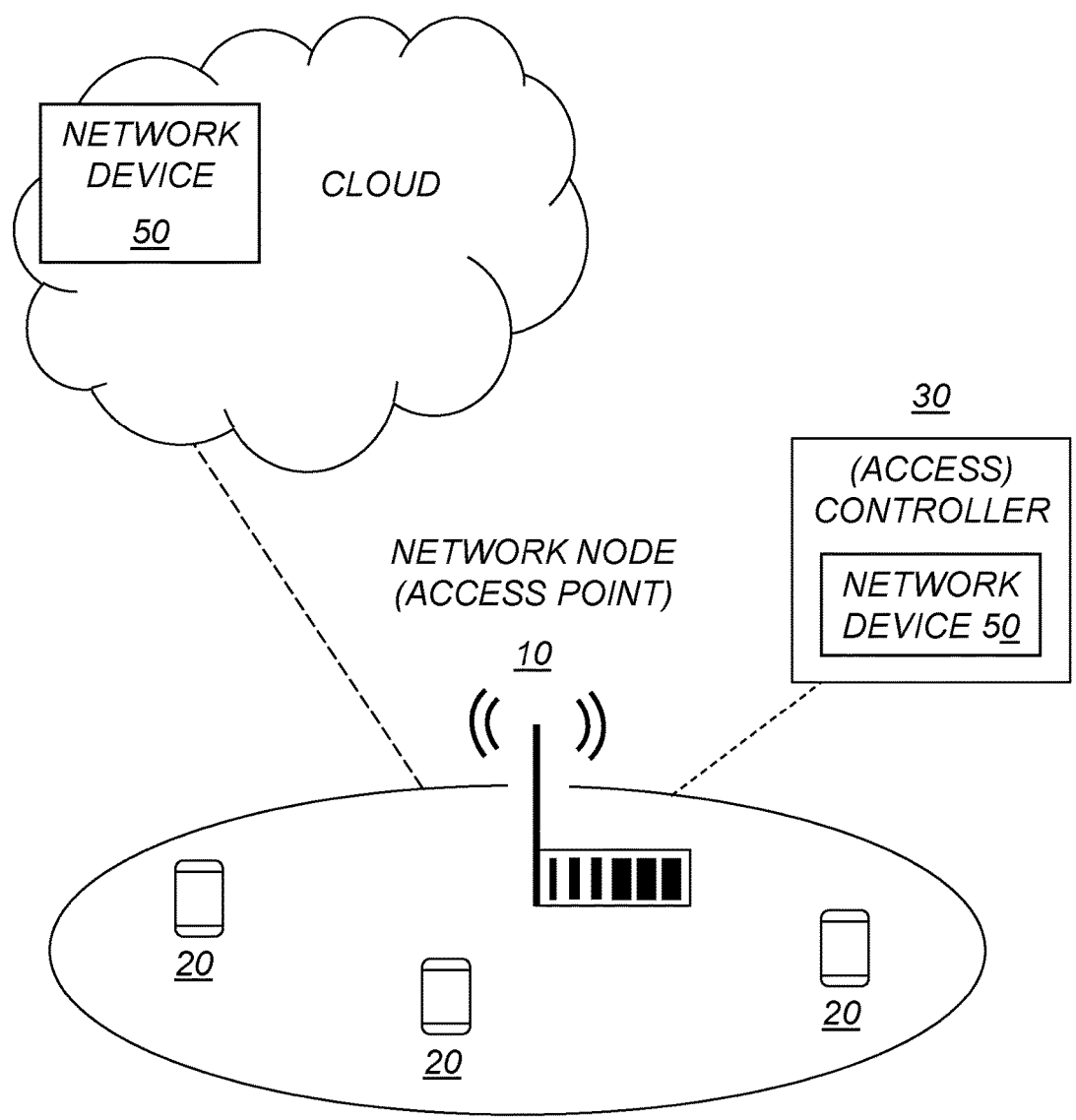
FIG. 19 is a schematic diagram illustrating an example of possible locations of a network device according to the proposed technology.

FIG. 19 is a schematic diagram illustrating an example of possible locations of a network device according to the proposed technology. The network device 50 may for example be implemented in a network node 10; 30 of a wireless communication system, or in a cloud-based environment as a cloud-based network device. In the latter case, the classification and/or selection described herein may be implemented for execution in a cloud-based network device, with suitable transfer of information between the cloud-based network device and the relevant network nodes and/or wireless communication devices of the wireless communication system.

A Network Device (ND) may generally be seen as an electronic device being communicatively connected to other electronic devices in the network.

By way of example, the network device may be implemented in hardware, software or a combination thereof. For example, the network device may be a special-purpose network device or a general purpose network device, or a hybrid thereof.

A special-purpose network device may use custom processing circuits and a proprietary operating system (OS), for execution of software to provide one or more of the features or functions disclosed herein.

A general purpose network device may use common off-the-shelf (COTS) processors and a standard OS, for execution of software configured to provide one or more of the features or functions disclosed herein.

By way of example, a special-purpose network device may include hardware comprising processing or computing resource(s), which typically include a set of one or more processors, and physical network interfaces (NIs), which sometimes are called physical ports, as well as non-transitory machine readable storage media having stored thereon software. A physical NI may be seen as hardware in a network device through which a network connection is made, e.g. wirelessly through a wireless network interface controller (WNIC) or through plugging in a cable to a physical port connected to a network interface controller (NIC). During operation, the software may be executed by the hardware to instantiate a set of one or more software instance(s). Each of the software instance(s), and that part of the hardware that executes that software instance, may form a separate virtual network element.

By way of another example, a general purpose network device may for example include hardware comprising a set of one or more processor(s), often COTS processors, and network interface controller(s) (NICs), as well as non-transitory machine readable storage media having stored thereon software. During operation, the processor(s) executes the software to instantiate one or more sets of one or more applications. While one embodiment does not implement virtualization, alternative embodiments may use different forms of virtualization—for example represented by a virtualization layer and software containers. For example, one such alternative embodiment implements operating system-level virtualization, in which case the virtualization layer represents the kernel of an operating system (or a shim executing on a base operating system) that allows for the creation of multiple software containers that may each be used to execute one of a sets of applications. In an example embodiment, each of the software containers (also called virtualization engines, virtual private servers, or jails) is a user space instance (typically a virtual memory space). These user space instances may be separate from each other and separate from the kernel space in which the operating system is executed; the set of applications running in a given user space, unless explicitly allowed, cannot access the memory of the other processes. Another such alternative embodiment implements full virtualization, in which case: 1) the virtualization layer represents a hypervisor (sometimes referred to as a Virtual Machine Monitor (VMM)) or the hypervisor is executed on top of a host operating system; and 2) the software containers each represent a tightly isolated form of software container called a virtual machine that is executed by the hypervisor and may include a guest operating system.

A hypervisor is the software/hardware that is responsible for creating and managing the various virtualized instances and in some cases the actual physical hardware. The hypervisor manages the underlying resources and presents them as virtualized instances. What the hypervisor virtualizes to appear as a single processor may actually comprise multiple separate processors. From the perspective of the operating system, the virtualized instances appear to be actual hardware components.

A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications as well as the virtualization layer and software containers if implemented, are collectively referred to as software instance(s). Each set of applications, corresponding software container if implemented, and that part of the hardware that executes them (be it hardware dedicated to that execution and/or time slices of hardware temporally shared by software containers), forms a separate virtual network element(s).

The virtual network element(s) may perform similar functionality compared to Virtual Network Element(s) (VNEs). This virtualization of the hardware is sometimes referred to as Network Function Virtualization (NFV)). Thus, NFV may be used to consolidate many network equipment types onto industry standard high volume server hardware, physical switches, and physical storage, which could be located in data centers, NDs, and Customer Premise Equipment (CPE). However, different embodiments may implement one or more of the software container(s) differently. For example, while embodiments are illustrated with each software container corresponding to a VNE, alternative embodiments may implement this correspondence or mapping between software container-VNE at a finer granularity level; it should be understood that the techniques described herein with reference to a correspondence of software containers to VNEs also apply to embodiments where such a finer level of granularity is used.

According to yet another embodiment, there is provided a hybrid network device, which includes both custom processing circuitry/proprietary OS and COTS processors/standard OS in a network device, e.g. in a card or circuit board within a network device ND. In certain embodiments of such a hybrid network device, a platform Virtual Machine (VM), such as a VM that implements functionality of a special-purpose network device, could provide for para-virtualization to the hardware present in the hybrid network device.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

REFERENCES

[1] WO2011/035204.
[2] "MUTE: Sounding inhibition for MU-MIMO WLANs", by Bejarano et al. in 2014 Eleventh Annual IEEE International Conference on Sensing, Communication, and Networking (SECON), 20140630 IEEE, 135-143.
[3] "On the prediction of time-varying channels in MISO beamforming systems", by Ding et al. in Wireless Communications & Signal Processing, 2009. WCSP 2009 International Conference, 20091113 IEEE, Piscataway, N.J., USA, 1-5.

The invention claimed is:

1. A method for enabling channel state feedback for multi-user transmission in a wireless communication system, wherein the method comprises:
   obtaining, for each particular user of a plurality of users, information representing a temporal variation of a channel between a multi-user transmission network node and the particular user;
   performing a classification of each particular user into one of at least two groups based on a measure of a speed of temporal channel variation for the particular user;
   selecting, for each particular user, one of a plurality of different channel state feedback mechanisms based on the classification of that particular user; and
   triggering, for each particular user, the selected channel state feedback mechanism to obtain channel state feedback information from that particular user,
   wherein the steps of performing a classification and selecting a channel state feedback mechanism based on the classification are repeated at different time instances to enable dynamic switching, for each particular user, between different channel state feedback mechanisms over time.

2. The method of claim 1, wherein the at least two groups include a FAST variation group and a SLOW variation group.

3. The method of claim 1, wherein the channel state feedback mechanism is selected, for each particular user, among a plurality of different channel state feedback mechanisms.

4. The method of claim 3, wherein the plurality of different channel state feedback mechanisms include a POLL feedback mechanism and a PIGGYBACK feedback mechanism.

5. The method of claim 4, wherein the POLL feedback mechanism is selected for a user in a group with fast temporal channel variation, and the PIGGYBACK feedback mechanism is selected for a user in a group with slow temporal channel variation.

6. The method of claim 1, wherein the information representative of the temporal channel variation is obtained by estimating the temporal channel variation at the multi-user transmission network node.

7. The method of claim 1, wherein the information representative of the temporal channel variation is obtained from each particular user.

8. The method of claim 7, wherein the information representative of the temporal channel variation is received in a CHANNEL VARIATION REPORT.

9. The method of claim 7, wherein the information representative of the temporal channel variation is received in a management frame.

10. The method of claim 7, wherein the information representative of the temporal channel variation is received in a Medium Access Control (MAC) header of a packet from each particular user.

11. The method of claim 7, wherein the multi-user transmission network node sends a message to a particular user for requesting the information representative of the temporal channel variation from the user or for configuring conditions for sending the information representative of the temporal channel variation from the user.

12. The method of claim 1, wherein the selected channel state feedback mechanism is triggered by setting a CSI request field in a Medium Access Control (MAC) header of a packet to the particular user.

13. The method of claim 1, wherein the method is performed by an access point or access controller for enabling channel state feedback for multi-user transmission to associated stations in a Wireless Local Area Network.

14. The method of claim 1, wherein the multi-user transmission comprises one of: Orthogonal Frequency Division Multiple Access (OFDMA) transmission with Frequency Selective Scheduling (FSS) and Multi-User Multiple Input Multiple Output (MU-MIMO) transmission.

15. A method performed by a network node adapted for communication with a plurality of wireless communication devices in a wireless communication system, wherein the method comprises:
   obtaining, for each particular wireless communication device of the plurality of devices, information representing a temporal variation of a channel between the network node and the particular wireless communication device;
   grouping the plurality of wireless communication devices into at least two groups according to a measure of the speed of the temporal channel variation of the wireless communication devices, wherein grouping comprises performing, for each of the wireless communication devices, a classification of the wireless communication device into one of the groups based on how fast the channel varies in time;
   selecting, for each particular group, one of a plurality of different channel state feedback mechanisms to acquire channel state information from the particular group; and
   triggering, for each particular wireless communication device, the channel state feedback mechanism selected for the group associated with the particular wireless communication device, to obtain channel state feedback information from the particular wireless communication device,
   wherein the steps of performing a classification and selecting a channel state feedback mechanism based on the classification are repeated at different time instances to enable dynamic switching, for each particular user, between different channel state feedback mechanisms over time.

16. The method of claim 15, wherein a POLL feedback mechanism is selected for a group with fast temporal channel variation, and a PIGGYBACK feedback mechanism is selected for a group with slow temporal channel variation.

17. The method of claim 15, further comprising:
   sending, to each particular wireless communication device, a request message for
      requesting information representative of temporal channel variation from the wireless communication device and/or a configuration message for configuring conditions for the wireless communication device to send the information representative of the temporal channel variation; and
      obtaining the information representative of the temporal channel variation from the wireless communication device by receiving a response to the request message.

18. A method, performed by a wireless communication device, for enabling channel state feedback in a wireless communication system, wherein the method comprises:
   estimating temporal channel variation for a channel between a network node and the wireless communication device; and
   sending information representative of the temporal channel variation to the network node;
   receiving, from the network node, a channel state feedback mechanism selected based on a grouping of the wireless communication device, into one of at least two groups, based on a measure of the speed of the temporal variation of the channel between the network node and the wireless communication device, wherein grouping comprises performing, for each of the wireless communication devices, a classification of the wireless communication device into one of the groups based on how fast the channel varies in time and wherein the performance of a classification and selection of the channel state feedback mechanism based on the classification are repeated at different time instances to enable dynamic switching, for each particular user, between different channel state feedback mechanisms over time; and
   sending, to the network node, channel state information (CSI) according to the received channel sate feedback mechanism.

19. A device configured to enable channel state feedback for multi-user transmission in a wireless communication system, the device comprising:
   at least one processor; and
   at least one memory storing computer-executable instructions that, when executed by the at least one processor, configure the device to:
      obtain, for each particular user of a plurality of users, information representing a temporal variation of a channel between a multi-user transmission network node and the particular user;
      perform a classification of each particular user into one of at least two groups based on a measure of the speed of the temporal channel variation for the particular user;
      select, for each particular user, one of a plurality of different channel state feedback mechanisms based on the classification of that particular user; and
      trigger, for each particular user, the selected channel state feedback mechanism to obtain channel state feedback information from that particular user,
      wherein the performance of a classification and selection of the channel state feedback mechanism based on the classification are repeated at different time instances to enable dynamic switching, for each particular user, between different channel state feedback mechanisms over time.

20. The device of claim 19, wherein execution of the instructions configures the device to select a POLL feedback mechanism for a user in a group with fast temporal channel variation, and select a PIGGYBACK feedback mechanism for a user in a group with slow temporal channel variation.

21. The device of claim 19, wherein the device comprises a network device implemented in a network node of a wireless communication system, or implemented as a cloud-based network device.

22. A network node configured for communication with a plurality of wireless communication devices in a wireless communication system, the network node comprising:
   at least one processor; and
   at least one memory storing computer-executable instructions that, when executed by the at least one processor, configure the network node to:
      obtain, for each particular wireless communication device of the plurality of devices, information representing a temporal variation of a channel between the network node and the particular wireless communication device;
      group the plurality of wireless communication devices into at least two groups according to a measure of the speed of the temporal channel variation of the wireless communication devices, wherein grouping comprises performing, for each of the wireless communication devices, a classification of the wireless communication device into one of the groups based on how fast the channel varies in time;
      select, for each particular group, one of a plurality of different channel state feedback mechanisms to acquire channel state information from the particular group; and
      trigger, for each particular wireless communication device, the channel state feedback mechanism selected for the group associated with the particular wireless communication device, to obtain channel state feedback information from the particular wireless communication device,
      wherein the steps of performing a classification and selecting a channel state feedback mechanism based on the classification are repeated at different time instances to enable dynamic switching, for each particular user, between different channel state feedback mechanisms over time.

23. The network node of claim 22, wherein execution of the instructions configures the network node to select a POLL feedback mechanism for a group with fast temporal channel variation, and select a PIGGYBACK feedback mechanism for a group with slow temporal channel variation.

24. The network node of claim 22, wherein the network node is an access point or access controller configured to enable channel state feedback for multi-user transmission to associated stations in a Wireless Local Area Network.

25. The network node of claim 22, wherein execution of the instructions further configures the network node to:
   send, to a wireless communication device, i) a request message for requesting information representative of temporal channel variation from the wireless communication device and/or ii) a configuration message for configuring conditions for the wireless communication device to send the information representative of the temporal channel variation; and
   obtain the information representative of the temporal channel variation from the wireless communication device by receiving a response to: i) the request message and/or ii) the configuration message.

26. A wireless communication device configured to enable channel state feedback in a wireless communication system, the wireless device comprising:
   at least one processor; and
   at least one memory storing computer-executable instructions that, when executed by the at least one processor, configure the wireless device to:
      estimate temporal channel variation for a channel between a network node and the wireless communication device;
      send information representative of the temporal channel variation to the network node;
      receive, from the network node, a channel state feedback mechanism selected based on a grouping of the wireless communication device, into one of at least two groups, based on a measure of the speed of the temporal variation of the channel between the network node and the wireless communication device, wherein grouping comprises performing, for each of the wireless communication devices, a classification of the wireless communication device into one of the groups based on how fast the channel varies in time and wherein the performance of a classification and selection of the channel state feedback mechanism based on the classification are repeated at different time instances to enable dynamic switching, for each particular user, between different channel state feedback mechanisms over time; and
      send, to the network node, channel state information (CSI) according to the received channel state feedback mechanism.

27. A non-transitory computer-readable medium storing a computer program that, when executed by a processor of a network device configured for operation in a wireless communication system, cause the network device to, with respect to channel state feedback for multi-user transmission in the wireless communication system:
   obtain, for each particular user of a plurality of users, information representing a temporal variation of a channel between a multi-user transmission network node and the particular user;
   perform a classification of each particular user into one of at least two groups based on a measure of the speed of the temporal channel variation for the particular user; and
   select, for each particular user, one of a plurality of different channel state feedback mechanisms based on the classification of that particular user; and
   trigger, for each particular user, the selected channel state feedback mechanism to obtain channel state feedback information from that particular user,
   wherein the steps of performing a classification and selecting a channel state feedback mechanism based on the classification are repeated at different time instances to enable dynamic switching, for each particular user, between different channel state feedback mechanisms over time.

28. A non-transitory computer-readable medium storing a computer program comprising instructions that, when executed by a processor of a network device configured for operation in a wireless communication system, cause the network device to:

obtain, for each particular wireless communication device of a plurality of devices, information representing a temporal variation of a channel between a multi-user transmission network node and the particular wireless communication device;

group the wireless communication devices into at least two groups according to a measure of the speed of the temporal channel variation of the wireless communication devices, wherein grouping comprises performing, for each of the wireless communication devices, a classification of the wireless communication device into one of the groups based on how fast the channel varies in time;

select, for each particular group, one of a plurality of different channel state feedback mechanisms to acquire channel state information from the particular group; and trigger, for each particular wireless communication device, the channel state feedback mechanism selected for the group associated with the particular wireless communication device, to obtain channel state feedback information from the particular wireless communication device, wherein the steps of performing a classification and selecting a channel state feedback mechanism based on the classification are repeated at different time instances to enable dynamic switching, for each particular user, between different channel state feedback mechanisms over time.

* * * * *